United States Patent
Matsuda

(10) Patent No.: US 12,555,223 B2
(45) Date of Patent: Feb. 17, 2026

(54) PRINTED MATERIAL INSPECTION DEVICE, PRINTED MATERIAL INSPECTION METHOD, PROGRAM, AND PRINTING SYSTEM

(71) Applicant: FUJIFILM Corporation, Tokyo (JP)

(72) Inventor: Takashi Matsuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 343 days.

(21) Appl. No.: 18/496,923

(22) Filed: Oct. 30, 2023

(65) Prior Publication Data
US 2024/0161273 A1 May 16, 2024

(30) Foreign Application Priority Data
Nov. 10, 2022 (JP) .................... 2022-180572

(51) Int. Cl.
*G06T 7/00* (2017.01)

(52) U.S. Cl.
CPC .... *G06T 7/001* (2013.01); *G06T 2207/10024* (2013.01); *G06T 2207/20081* (2013.01); *G06T 2207/30144* (2013.01)

(58) Field of Classification Search
CPC ........... G06T 7/001; G06T 2207/10024; G06T 2207/20081; G06T 2207/30144; G06T 7/0004
See application file for complete search history.

(56) References Cited

U.S. PATENT DOCUMENTS

| 2021/0114368 A1 | 4/2021 | Ukishima |
| 2021/0304384 A1* | 9/2021 | Nakada .............. H04N 1/00087 |
| 2022/0198638 A1 | 6/2022 | Seki |

FOREIGN PATENT DOCUMENTS

| JP | 7110349 | 8/2022 |
| WO | 2021054200 | 3/2021 |

* cited by examiner

*Primary Examiner* — Christopher Wait
(74) *Attorney, Agent, or Firm* — JCIPRNET

(57) ABSTRACT

A printed material inspection device for detecting types of defects of a printed material by using inspection data based on a captured image of the printed material and reference data which is a digital image of a printing target image indicated by print data of the printed material, includes: one or more storage devices; and one or more processors configured to acquire the reference data, perform, as preprocessing of converting the reference data for comparing the reference data and the inspection data to each other, types of preprocessing, which are different depending on a defect type of a detection target, on the reference data before the inspection data is acquired, to generate pieces of comparison reference data, which are different depending on the defect type of the detection target, from the reference data, and hold the pieces of comparison reference data in the one or more storage devices.

24 Claims, 12 Drawing Sheets

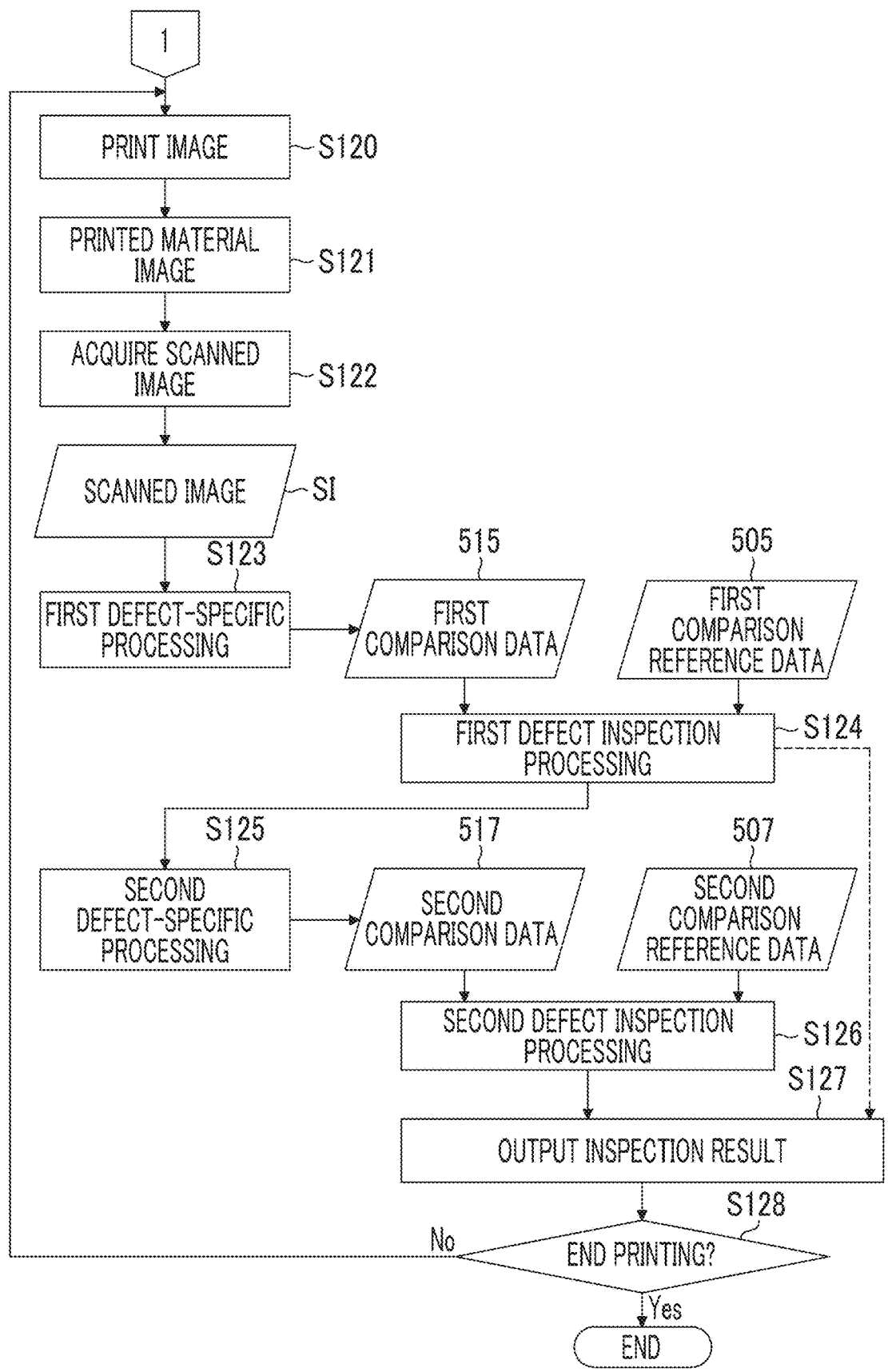

PRINTED MATERIAL INSPECTION DEVICE, PRINTED MATERIAL INSPECTION METHOD, PROGRAM, AND PRINTING SYSTEM

CROSS-REFERENCE TO RELATED APPLICATION

The present application claims priority under 35 U.S.C § 119(a) to Japanese Patent Application No. 2022-180572 filed on Nov. 10, 2022, which is hereby expressly incorporated by reference, in its entirety, into the present application.

BACKGROUND OF THE INVENTION

1. Field of the Invention

The present disclosure relates to a printed material inspection device, a printed material inspection method, a program, and a printing system, and particularly to an image processing technique for detecting a defect from a printed material.

2. Description of the Related Art

JP7110349B describes a method of generating a machine learning model for detecting a defect of a printed material by comparing inspection data, which is acquired based on a captured image obtained by imaging the printed material, and reference data, which is acquired based on print digital data, to each other by using the machine learning model. The method described in JP7110349B comprises: an acquisition step of acquiring training inspection data based on a captured image obtained by imaging a printed material as an inspection target printed based on training print digital data, training defect information of the training inspection data estimated by performing comparison processing between first training reference data based on the captured image obtained by imaging the printed material as a reference printed based on the training print digital data and the training inspection data, and second training reference data based on the training print digital data; and a generation step of generating a machine learning model by using the training inspection data and the second training reference data at least as training input information and by using the training defect information at least as training output information.

WO2021/054200A describes a printed material inspection device comprising: a print data acquisition unit that acquires print data input to a printing apparatus in a case of generating a printed material; an imaged data acquisition unit that acquires imaged data of the printed material; a registration processing unit that performs registration between the print data and the imaged data by applying a specified registration accuracy; and an inspection processing unit that acquires defect information of the imaged data based on the print data by using the print data and the imaged data that have been subjected to the registration processing by the registration processing unit, wherein a learning model that is trained with a relationship between a defect candidate detected from the imaged data and a defect in the printed material is applied to the inspection processing unit, the learning model receives, as an input, a disturbance-applied imaged data to which a disturbance that shifts a position of the imaged data in a registration accuracy range in a direction intersecting a relative transport direction between a printing unit and a medium in the printing apparatus is applied, and training is performed by using a disturbance application training data set that outputs defect information of the disturbance-applied imaged data.

SUMMARY OF THE INVENTION

JP7110349B describes the machine learning model that is targeted at various types of defects such as ink omission, ink dripping, dust adhesion, other spot-like defects, unevenness, scratches, and streak-shaped defects due to a nozzle failure in an ink jet nozzle as defects of a printed material. However, in JP7110349B, it is assumed that a plurality of types of defects are detected by one (a single) model, and processing is performed on the plurality of types of defects using the same model, so that there is a problem in that it is difficult to improve the accuracy of inspection.

In addition, in a case where the processing is to be performed on the plurality of types of defects by the same model, it is necessary to extract a large number of feature amounts from each of the inspection data and the reference data, resulting in an increase in parameters of the model. Therefore, there is a problem that a processing time also increases.

On the other hand, an object to be achieved by the invention described in WO2021/054200A is to suppress erroneous detection in detection of a streak defect that occurs in one direction of the printed material, and the accuracy of the detection for a specific type of defect, that is, the streak defect can be improved. However, there is a problem in that the invention described in WO2021/054200A cannot fully cope with the detection of the plurality of types of defects including defects other than the streak defect.

In addition to the above-described problems, in a case where inspection is immediately performed on each of a plurality of printed materials continuously printed in a production process of the printed materials, the inspection processing for one printed material needs to be performed within a short time until a captured image of the next printed material is obtained.

In order to improve the accuracy of the inspection, it is necessary to perform complex processing such that a defect can be extracted in more detail from an image as an inspection target. On the other hand, in a case where the complex processing is performed, the processing takes time. Therefore, there is a trade-off between the processing time and the accuracy. Furthermore, the processing becomes more complex in order to inspect the plurality of types of defects, and it is even more difficult to achieve both an improvement in a processing speed (suppression of the processing time) and an improvement in the accuracy.

The present disclosure has been made in view of such circumstances, and an object thereof is to provide a printed material inspection device, a printed material inspection method, a program, and a printing system capable of realizing an improvement in accuracy and an improvement in a processing speed of inspection for a plurality of types of defects that can occur in a printed material.

A printed material inspection device according to a first aspect of the present disclosure is a printed material inspection device for detecting a plurality of types of defects of a printed material by using inspection data acquired based on a captured image obtained by imaging the printed material and reference data which is a digital image of a printing target image indicated by print data of the printed material, the printed material inspection device comprising: one or more processors; and one or more storage devices, wherein the one or more processors are configured to acquire the reference data, perform, as preprocessing of converting the reference data for comparing the reference data and the inspection data to each other, a plurality of types of preprocessing, which are different depending on a defect type of a detection target, on the reference data before the inspection data is acquired, to generate a plurality of pieces of comparison reference data, which are different depending on the defect type of the detection target, from the reference data, and hold the plurality of pieces of comparison reference data in the one or more storage devices.

According to the first aspect, since the reference data to be compared to the inspection data is a digital image acquired based on the print data without performing printing with the printing apparatus, the one or more processors can acquire the reference data prior to the acquisition of the inspection data. According to the first aspect, since the plurality of types of preprocessing corresponding to the defect type of the inspection target are performed in advance on the reference data before the acquisition of the inspection data, and the plurality of pieces of comparison reference data, which are different depending on the defect type of the detection target, are held, it is possible to reduce the number of processes for dynamic processing performed after the acquisition of the inspection data, and it is possible to improve the processing speed.

In addition, since a processing method suitable for, for each defect type of a detection target, detecting a defect belonging to the defect type can be adopted, and time-consuming and complex preprocessing can be performed on the reference data, it is possible to increase the accuracy of detection for each type of defect as the detection target.

A printed material inspection device according to a second aspect of the present disclosure may have a configuration in which, in the printed material inspection device according to the first aspect, the plurality of types of preprocessing include first feature amount extraction processing of extracting a feature amount indicating an image feature of the reference data. The feature amount extracted by the first feature amount extraction processing can be used as the comparison reference data. In the first feature amount extraction processing, the feature amount may be extracted from the reference data, or the feature amount may be extracted from an image obtained by performing image conversion on the reference data. Since the feature amount indicating the image feature of the reference data has a smaller data amount than the reference data itself, by holding the feature amount as the comparison reference data instead of holding the reference data, a storage capacity required for data storage can be suppressed.

A printed material inspection device according to a third aspect of the present disclosure may have a configuration in which, in the printed material inspection device according to the second aspect, the first feature amount extraction processing is performed by using a first deep learning model.

As one of the plurality of types of preprocessing, the first feature amount extraction processing using the first deep learning model can be applied.

A printed material inspection device according to a fourth aspect of the present disclosure may have a configuration in which, in the printed material inspection device according to any one of the first to third aspects, the plurality of types of preprocessing include image conversion processing of bringing a data configuration of the reference data close to a data configuration of the inspection data.

For example, the first feature amount extraction processing using the first deep learning model of the third aspect is applied as one of the plurality of types of preprocessing, and the image conversion processing of the fourth aspect can be applied as another one.

A printed material inspection device according to a fifth aspect of the present disclosure may have a configuration in which, in the printed material inspection device according to the fourth aspect, the image conversion processing includes resolution conversion processing.

A printed material inspection device according to a six aspect of the present disclosure may have a configuration in which, in the printed material inspection device according to the fourth or fifth aspect, the image conversion processing includes color conversion processing of converting a color space of the reference data into a color space of the captured image.

A printed material inspection device according to a seventh aspect of the present disclosure may have a configuration in which, in the printed material inspection device according to the sixth aspect, the reference data is represented by CMYK data including color information of cyan, magenta, yellow, and black, the captured image is represented by RGB data including color information of red, green, and blue, and the color conversion processing includes processing of converting the CMYK data into the RGB data.

A printed material inspection device according to an eighth aspect of the present disclosure may have a configuration in which, in the printed material inspection device according to any one of the fourth to seventh aspects, the image conversion processing includes noise addition processing of adding noise included in the inspection data to the reference data.

A printed material inspection device according to a ninth aspect of the present disclosure may have a configuration in which, in the printed material inspection device according to the eighth aspect, the noise included in the inspection data includes at least one of geometric noise or optical noise.

A printed material inspection device according to a tenth aspect of the present disclosure may have a configuration in which, in the printed material inspection device according to any one of the first to ninth aspects, the plurality of types of preprocessing include at least one of edge extraction processing or blurring processing.

A printed material inspection device according to an eleventh aspect of the present disclosure may have a configuration in which, in the printed material inspection device according to the tenth aspect, the plurality of types of preprocessing include the edge extraction processing and the blurring processing, and the one or more processors are configured to hold edge extraction data obtained by performing the edge extraction processing and blurring-processed data obtained by performing the blurring processing in the one or more storage devices.

A printed material inspection device according to a twelfth aspect of the present disclosure may have a configuration in which, in the printed material inspection device according to any one of the first to eleventh aspects, the one or more processors are configured to: acquire the inspection data; generate a plurality of pieces of comparison data, which are different depending on the defect type of the detection target, based on the inspection data; and perform comparison processing of comparing each of the plurality of pieces of comparison data to the corresponding comparison reference data for each defect type of the detection target.

A printed material inspection device according to a thirteenth aspect of the present disclosure may have a configuration in which, in the printed material inspection device according to the twelfth aspect, the one or more processors are configured to perform a plurality of types of processing, which are different depending on the defect type of the detection target, on the inspection data in order to obtain the plurality of pieces of comparison data, and the plurality of types of processing performed on the inspection data include second feature amount extraction processing of extracting a feature amount of the inspection data.

A printed material inspection device according to a fourteenth aspect of the present disclosure may have a configuration in which, in the printed material inspection device according to the thirteenth aspect, the second feature amount extraction processing is performed by using a second deep learning model.

A printed material inspection device according to a fifteenth aspect of the present disclosure may have a configuration in which, in the printed material inspection device according to the twelfth to fifteenth aspects, the comparison processing includes processing using a machine learning model that is trained to receive the comparison data and the corresponding comparison reference data and to output at least one information of a presence or absence of the defect, a degree of the defect, or a position of the defect.

A printed material inspection device according to a sixteenth aspect of the present disclosure may have a configuration in which, in the printed material inspection device according to the fifteenth aspect, the machine learning model is a third deep learning model.

A printed material inspection device according to a seventeenth aspect of the present disclosure may have a configuration in which, in the printed material inspection device according to the twelfth to sixteenth aspects, the comparison processing includes difference processing of calculating a difference between the comparison data and the corresponding comparison reference data.

A printed material inspection device according to an eighteenth aspect of the present disclosure may have a configuration in which, in the printed material inspection device according to any one of the first to seventeenth aspects, the plurality of types of defects include a first defect, which is a streak-shaped defect, and a second defect other than the first defect.

A printed material inspection device according to a nineteenth aspect of the present disclosure may have a configuration in which, in the printed material inspection device according to the eighteenth aspect, the one or more processors are configured to: perform, in order to perform processing of detecting the first defect, compression processing of compressing image information in a transport direction of a printing medium during printing of the printed material on each of the reference data and the inspection data; and perform, in order to perform processing of detecting the second defect, low-resolution processing on each of the reference data and the inspection data.

A printed material inspection device according to a twentieth aspect of the present disclosure may have a configuration in which, in the printed material inspection device according to the eighteenth or nineteenth aspect, the one or more processors are configured to: in order to detect the first defect, extract a feature amount indicating an image feature of the reference data using a first deep learning model as first preprocessing in the plurality of types of preprocessing and hold the extracted feature amount in the one or more storage devices as first comparison reference data in the plurality of pieces of comparison reference data; and in order to detect the second defect, perform image conversion processing of bringing a data configuration of the reference data close to a data configuration of the inspection data as second preprocessing in the plurality of types of preprocessing and hold conversion data obtained by the image conversion processing in the one or more storage devices as second comparison reference data in the plurality of pieces of comparison reference data.

A printed material inspection device according to a twenty-first aspect of the present disclosure may have a configuration in which, in the printed material inspection device according to the twentieth aspect, the image conversion processing includes at least one processing of resolution conversion processing, color conversion processing, edge extraction processing, blurring processing, or noise addition processing.

A printing system according to a twenty-second aspect of the present disclosure comprises: the printed material inspection device according to any one of the first to twenty-first aspects; a printing apparatus that performs printing based on the print data to generate the printed material; and an imaging device that images the printed material.

A printed material inspection method according to a twenty-third aspect of the present disclosure is a printed material inspection method of detecting a plurality of types of defects of a printed material by using inspection data acquired based on a captured image obtained by imaging the printed material and reference data which is a digital image of a printing target image indicated by print data of the printed material, the printed material inspection method comprising: via one or more processors, acquiring the reference data; performing, as preprocessing of converting the reference data for comparing the reference data and the inspection data to each other, a plurality of types of preprocessing, which are different depending on a defect type of a detection target, on the reference data before the inspection data is acquired, to generate a plurality of pieces of comparison reference data, which are different depending on the defect type of the detection target, from the reference data; and holding the plurality of pieces of comparison reference data in one or more storage devices.

The printed material inspection method according to the twenty-third aspect can be configured to include a specific aspect similar to that of the printed material inspection device according to any one of the second to twenty-first aspects.

A program according to a twenty-fourth aspect of the present disclosure is a program causing a computer to realize a function of detecting a plurality of types of defects of a printed material by using inspection data acquired based on a captured image obtained by imaging the printed material and reference data which is a digital image of a printing target image indicated by print data of the printed material, the program causing the computer to realize: a function of acquiring the reference data; a function of performing, as preprocessing of converting the reference data for comparing the reference data and the inspection data to each other, a plurality of types of preprocessing, which are different depending on a defect type of a detection target, on the reference data before the inspection data is acquired, to generate a plurality of pieces of comparison reference data, which are different depending on the defect type of the detection target, from the reference data; and a function of holding the plurality of pieces of comparison reference data in one or more storage devices.

The program according to the twenty-fourth aspect can be configured to include a specific aspect similar to that of the printed material inspection device according to any one of the second to twenty-first aspects. In addition, a non-transitory computer-readable recording medium (computer-readable medium) that is a tangible object on which the program according to the twenty-fourth aspect is recorded is also included in the scope of the present disclosure.

According to the aspects of the present disclosure, it is possible to achieve both an improvement in accuracy and an improvement in a processing speed of inspection corresponding to a plurality of types of defects that can occur in a printed material.

BRIEF DESCRIPTION OF THE DRAWINGS

FIG. 12 is a flowchart showing an example of an operation of the printing system including the printed material inspection device according to the embodiment.

DESCRIPTION OF THE PREFERRED EMBODIMENTS

Figure 1:
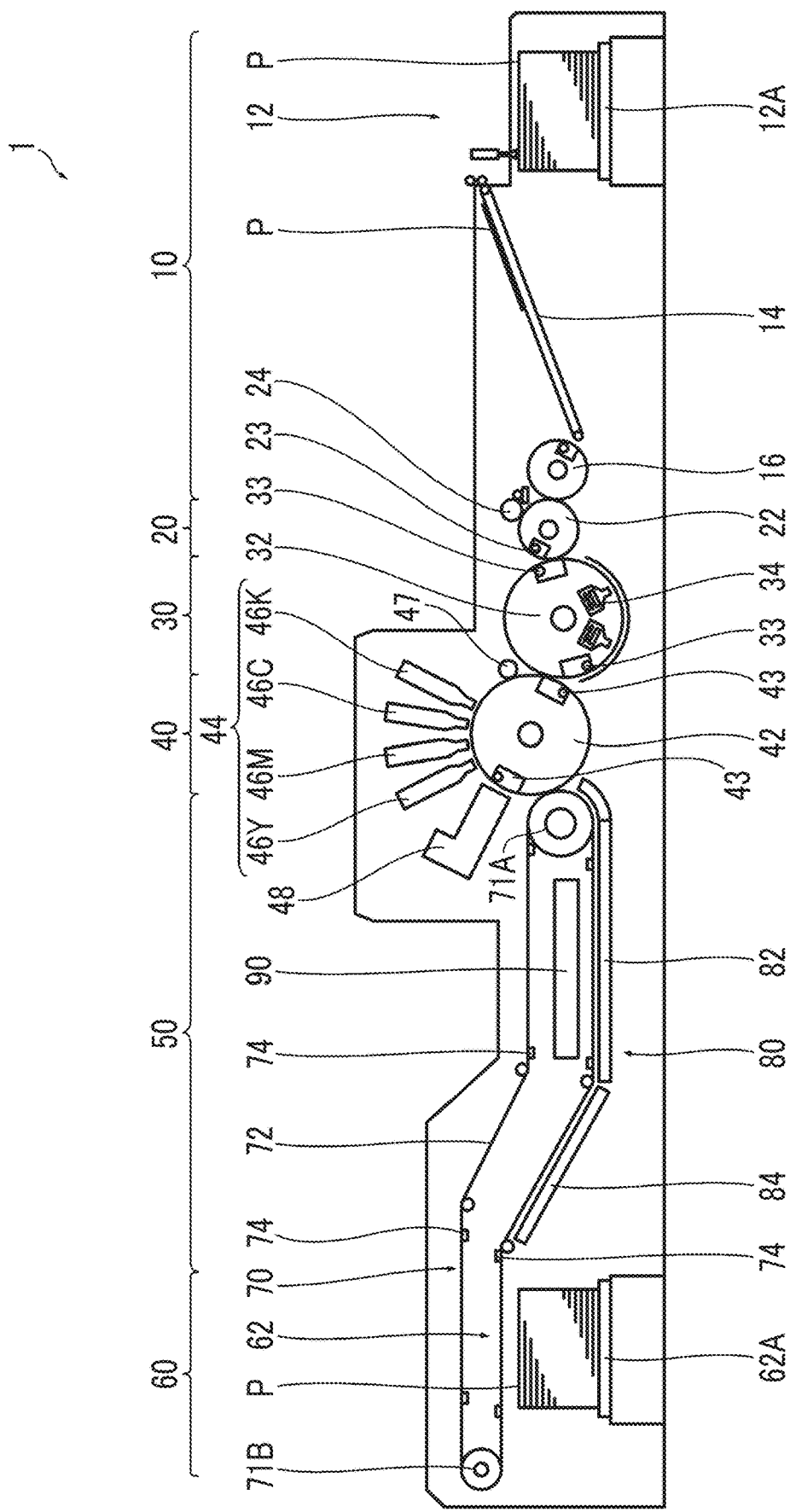
FIG. 1 is an overall configuration diagram schematically showing a configuration example of an ink jet printer to which a printed material inspection device according to an embodiment is applied.

Hereinafter, preferred embodiments of the present invention will be described in detail with reference to the accompanying drawings. In the present specification, the same components are denoted by the same reference numerals, and duplicate description thereof will be omitted as appropriate.

Configuration Example of Ink Jet Printer

FIG. 1 is an overall configuration diagram schematically showing a configuration example of an ink jet printer 1 to which a printed material inspection device according to an embodiment is applied. The ink jet printer 1 is a color digital printing apparatus that prints a desired image on paper P, which is sheet-fed paper, in a single-pass method using four color inks of cyan (C), magenta (M), yellow (Y), and black (K). In the present embodiment, an example in which an aqueous ink is used as an ink for drawing will be described. The aqueous ink refers to an ink obtained by dissolving or dispersing a coloring material such as a pigment or a dye in water and/or a water-soluble solvent.

The ink jet printer 1 includes a feeding unit 10, a treatment liquid applying unit 20, a treatment liquid drying unit 30, a drawing unit 40, an ink drying unit 50, and an accumulation unit 60.

The feeding unit 10 includes a feeding device 12, a feeder board 14, and a feeding drum 16. The paper P is placed on a feeding tray 12A in a state of a bundle in which a large number of sheets are stacked. The type of the paper P is not particularly limited, and for example, printing paper primarily containing cellulose, such as woodfree paper, coated paper, and art paper, can be used.

The feeding device 12 takes out the bundled sheets of paper P set in the feeding tray 12A one by one in order from the top and supplies the paper P to the feeder board 14. The feeder board 14 transports the paper P received from the feeding device 12 to the feeding drum 16.

The feeding drum 16 receives the paper P fed from the feeder board 14, and transports the received paper P to the treatment liquid applying unit 20.

The paper P is coated with the treatment liquid by the treatment liquid applying unit 20. The term "treatment liquid" is synonymous with a "pretreatment liquid". There are cases where the treatment liquid is referred to as a "precoat", a "preconditioner", an "undercoat liquid", a "treatment agent", or the like. The treatment liquid is a liquid having a function of allowing coloring material components in the ink to coagulate, insolubilize, or thicken. The treatment liquid applying unit 20 includes a treatment liquid coating drum 22 and a treatment liquid coating device 24.

The treatment liquid coating drum 22 receives the paper P from the feeding drum 16 and transports the received paper P to the treatment liquid drying unit 30. The treatment liquid coating drum 22 is provided with a gripper 23 on a peripheral surface of the drum, and by gripping and rotating a leading edge portion of the paper P with the gripper 23, the paper P is wound around the peripheral surface of the drum and transported.

The treatment liquid coating device 24 includes a coating roller, and the paper P transported by the treatment liquid coating drum 22 is coated with the treatment liquid. The coating roller is supported by a contact/separation mechanism (not shown) that is movable between a coating position at which the coating roller comes into contact with the paper P to coat the paper P with the treatment liquid and a retreat position at which the coating roller is separated from the paper P and coating with the treatment liquid is not performed. A method of coating the paper P with the treatment liquid is not limited to a roller coating method, and may be a blade coating method, an ink jet method, a spray method, or the like.

The treatment liquid drying unit 30 performs a drying treatment on the paper P coated with the treatment liquid. The treatment liquid drying unit 30 includes a treatment liquid drying drum 32 and a hot air blower 34. The treatment liquid drying drum 32 receives the paper P from the treatment liquid coating drum 22 and transports the received paper P to the drawing unit 40. The treatment liquid drying drum 32 is provided with grippers 33 on a peripheral surface of the drum. The treatment liquid drying drum 32 transports the paper P by gripping and rotating the leading edge portion of the paper P with the grippers 33.

The hot air blower 34 is installed inside the treatment liquid drying drum 32. The hot air blower 34 blows hot air onto the paper P transported by the treatment liquid drying drum 32 to dry the treatment liquid.

The drawing unit 40 includes a drawing drum 42, a head unit 44, a paper pressing roller 47, and a scanner 48. The drawing drum 42 receives the paper P from the treatment liquid drying drum 32 and transports the received paper P to the ink drying unit 50. The drawing drum 42 includes grippers 43 on a peripheral surface of the drum, and by gripping and rotating the leading edge of the paper P with the grippers 43, the paper P is wound around the peripheral surface of the drum and transported. The drawing drum 42 includes an adsorption mechanism (not shown), and allows the paper P wound around the peripheral surface of the drum to be adsorbed onto the peripheral surface of the drum and transported. A negative pressure is used for the adsorption. The drawing drum 42 is provided with a large number of adsorption holes on the peripheral surface, and an inside of the drawing drum 42 is suctioned through the adsorption holes to allow the paper P to be adsorbed onto the peripheral surface of the drawing drum 42.

The head unit 44 is configured to include ink jet heads 46C, 46M, 46Y, and 46K. The ink jet head 46C is a recording head that jets droplets of cyan ink. The ink jet head 46M is a recording head that jets droplets of magenta ink. The ink jet head 46Y is a recording head that jets droplets of yellow ink. The ink jet head 46K is a recording head that jets droplets of black ink. Ink is supplied to each of the ink jet heads 46C, 46M, 46Y, and 46K from an ink tank (not shown), which is an ink supply source of the corresponding color, through a pipe path (not shown).

Each of the ink jet heads 46C, 46M, 46Y, and 46K is configured with line heads that can perform printing on the paper P transported by the drawing drum 42 by one scanning, that is, by a single-pass method. Each of the ink jet heads 46C, 46M, 46Y, and 46K has a nozzle surface disposed facing the peripheral surface of the drawing drum 42. The ink jet heads 46C, 46M, 46Y, and 46K are disposed at regular intervals along a transport path of the paper P by the drawing drum 42.

Although not shown in FIG. 1, a plurality of nozzles, which are ink outlets, are two-dimensionally arranged on the nozzle surfaces of each of the ink jet heads 46C, 46M, 46Y, and 46K. The "nozzle surface" refers to a jetting surface on which the nozzles are formed, and is synonymous with a term such as "ink jetting surface" or "nozzle forming surface". The nozzle arrangement of the plurality of nozzles two-dimensionally arranged is referred to as a "two-dimensional nozzle arrangement".

Each of the ink jet heads 46C, 46M, 46Y, and 46K can be configured by connecting a plurality of head modules in a paper width direction. The paper width mentioned here refers to a paper width in a direction perpendicular to a transport direction of the paper P. The transport direction of the paper P is referred to as a Y direction. The paper width direction perpendicular to the Y direction is referred to as an X direction. Each of the ink jet heads 46C, 46M, 46Y, and 46K is a line-type recording head having a nozzle row capable of recording an image of the entire recording region of the paper P in the X direction at a specified printing resolution in one scanning. Such a recording head is also referred to as a "full-line type recording head" or a "page-wide head".

The specified printing resolution may be a printing resolution predetermined by the ink jet printer 1, or a printing resolution set by a user's selection or an automatic selection by a program according to a print mode. As the printing resolution, for example, 1200 dpi (dots per inch) in the X direction and 1200 dpi in the Y direction can be set.

There are cases where the paper width direction (X direction) perpendicular to the transport direction of the paper P is referred to as a nozzle row direction of the line head, and the transport direction (Y direction) of the paper P is referred to as a nozzle row vertical direction.

In a case of an ink jet head having a two-dimensional nozzle arrangement, a projected nozzle row obtained by projecting (orthography) each nozzle in the two-dimensional nozzle arrangement so as to be aligned along a nozzle row direction can be considered equivalent to a row of nozzle rows in which the nozzles are aligned at approximately equal intervals at a nozzle density that achieves a maximum recording resolution in the nozzle row direction. "Approximately equal intervals" means that dropped points that can be recorded by the ink jet printer 1 are at substantially equal intervals. For example, the concept of "equal interval" also includes a case in which intervals are set to be slightly different in consideration of movement of droplets on a medium due to manufacturing errors and/or landing interference. The projected nozzle row corresponds to a substantial nozzle row. In consideration of the projected nozzle row, each nozzle can be assigned a nozzle number representing a nozzle position in order of projected nozzles aligned along the nozzle row direction. The nozzle row direction is synonymous with a nozzle alignment direction.

An arrangement form of the nozzles in each of the ink jet heads 46C, 46M, 46Y, and 46K is not limited, and various forms of the nozzle arrangement can be adopted. For example, instead of a form of a matrix-like two-dimensional arrangement, a single row of linear arrangement, a V-shaped nozzle arrangement, a broken line-shaped nozzle arrangement such as a W-shaped arrangement having a V-shaped arrangement as a repeating unit, and the like are also possible.

Ink droplets are jetted from at least one of the ink jet heads 46C, 46M, 46Y, or 46K toward the paper P transported by the drawing drum 42, and the jetted droplets adhere to the paper P, whereby an image is formed on the paper P.

The drawing drum 42 functions as a relative movement mechanism that moves the ink jet heads 46C, 46M, 46Y, and 46K and the paper P relative to each other. The drawing drum 42 is a form of a mechanism that moves the paper P relative to the ink jet heads 46C, 46M, 46Y, and 46K. Each jetting timing of the ink jet heads 46C, 46M, 46Y, and 46K is synchronized with a rotary encoder signal obtained from a rotary encoder (not shown) installed in the drawing drum 42. The jetting timing is a timing at which ink droplets are jetted, and is synonymous with a dropping timing.

In this example, a configuration in which four color inks of CMYK are used is taken as an example, but the combination of the ink colors and the number of colors is not limited to the present embodiment, and light ink, dark ink, special color ink, or the like may be added as necessary. For example, a configuration in which an ink jet head that jets a light ink such as light cyan or light magenta is added, and/or a configuration in which an ink jet head that jets a special color ink such as green, orange, or white ink is added are possible. In addition, an arrangement order of the ink jet heads of the colors is not particularly limited.

The scanner 48 is an image reading device that optically reads an image recorded on the paper P by the ink jet heads 46C, 46M, 46Y, and 46K and generates electronic image data indicating the read image. The scanner 48 includes an imaging device that images the image recorded on the paper P and converts the image into an electrical signal indicating the image information. The scanner 48 may include, in addition to the imaging device, an illumination optical system that illuminates a reading target and a signal processing circuit that generates digital image data by processing the signal obtained from the imaging device.

The scanner 48 preferably has a configuration in which a color image can be read. In the scanner 48 of this example, for example, a color charge-coupled device (CCD) linear image sensor is used as the imaging device. The color CCD linear image sensor is an image sensor in which light-receiving elements including color filters of R (red), G (green), and B (blue) are linearly arranged. A color complementary metal oxide semiconductor (CMOS) linear image sensor can also be used instead of the color CCD linear image sensor. Alternatively, it is also possible to adopt an imaging device including complementary color filters instead of the imaging device including primary color filters. The scanner 48 reads the image on the paper P while the paper P is being transported by the drawing drum 42. There are cases where the scanner installed on the paper transport path as described above is referred to as an "in-line scanner". Alternatively, the scanner 48 may also be a camera. The paper P on which the image is recorded is an example of a "printed material" in the present disclosure. The scanner 48 is an example of an "imaging device" in the present disclosure. The read image obtained by the scanner 48 is an example of a "captured image" in the present disclosure.

When the paper P on which the image is recorded using at least one of the ink jet heads 46C, 46M, 46Y, or 46K passes through a reading region of the scanner 48, the image on the paper P is read. Images recorded on the paper P can include, in addition to an image (user image) as a printing target designated in a printing job, a defective nozzle detection pattern for inspecting a jetting state of each nozzle, a test pattern for correcting a density unevenness, and various other test images.

Presence or absence of an abnormality in image quality is determined by inspecting the printed image based on the data of the read image read by the scanner 48. Details of inspection processing will be described below. In addition, based on the data of the read image read by the scanner 48, information such as a density of the image and the jetting state of each of the nozzles of the ink jet heads 46K, 46C, 46M, and 46Y can be obtained. The scanner 48 of this example has a form in which the paper transport path between the head unit 44 and the ink drying unit 50 is disposed and the image is read before the ink is dried. However, a form in which a scanner is disposed to read an image after ink is dried is also possible instead of or in combination with the scanner 48.

The ink drying unit 50 performs a drying treatment on the paper P on which the image is formed by the drawing unit 40. The ink drying unit 50 includes a chain gripper 70, a paper guide 80, and a heat-drying treatment unit 90.

The chain gripper 70 receives the paper P from the drawing drum 42 and transports the received paper P to the accumulation unit 60. The chain gripper 70 includes a pair of endless chains 72 that runs on a specified running path, and transports the paper P along a specified transport path in a state of gripping the leading edge portion of the paper P with the grippers 74 provided in the pair of chains 72. A plurality of grippers 74 are provided on the chain 72 at regular intervals.

The chain gripper 70 of this example is configured to include first sprockets 71A, second sprockets 71B, the chains 72, and the plurality of grippers 74, and has a structure in which the pair of endless chains 72 are wound around a pair of the first sprockets 71A and a pair of the second sprockets 71B. FIG. 1 shows only one side of the pair of first sprockets 71A, the pair of second sprockets 71B, and the pair of chains 72.

The chain gripper 70 has a structure in which the plurality of grippers 74 are disposed at a plurality of positions in a feeding direction (length direction) of the chain 72. In addition, the chain gripper 70 has a structure in which the plurality of grippers 74 are disposed between the pair of chains 72 along the paper width direction. In FIG. 1, only one gripper 74 out of the plurality of grippers 74 arranged between the pair of chains 72 is shown.

The transport path of the paper P by the chain gripper 70 includes a horizontal transport region in which the paper P is transported along a horizontal direction and an inclined transport region in which the paper P is transported in an obliquely upward direction from an end of the horizontal transport region. The horizontal transport region is referred to as a first transport section, and the inclined transport region is referred to as a second transport section.

The paper guide 80 is a mechanism that guides the transportation of the paper P by the chain gripper 70. The paper guide 80 is configured to include a first paper guide 82 and a second paper guide 84. The first paper guide 82 guides the paper P transported in the first transport section of the chain gripper 70. The second paper guide 84 guides the paper transported in the second transport section at the rear of the first transport section. Although a detailed structure of the first paper guide 82 is not shown, an adsorption transport device using a suction type adsorption belt is applied as the first paper guide 82.

The heat-drying treatment unit 90 applies heat to the paper P on which the image is formed by the drawing unit 40 to evaporate the solvent of the ink, thereby drying the paper P. The heat-drying treatment unit 90 is, for example, a hot air blowing unit, which is disposed to face the first paper guide 82 and blows hot air onto the paper P transported by the chain gripper 70. In a case where an ultraviolet curable ink is used, an ultraviolet irradiation device is disposed instead of or in combination with the heat-drying treatment unit 90.

The accumulation unit 60 includes an accumulation device 62 that receives and accumulates the paper P transported from the ink drying unit 50 by the chain gripper 70. The chain gripper 70 releases the paper P at a predetermined accumulation position. The accumulation device 62 includes an accumulation tray 62A, receives the paper P released from the chain gripper 70, and accumulates the paper P in a bundle on the accumulation tray 62A. The accumulation unit 60 corresponds to a paper output unit.

Figure 2:
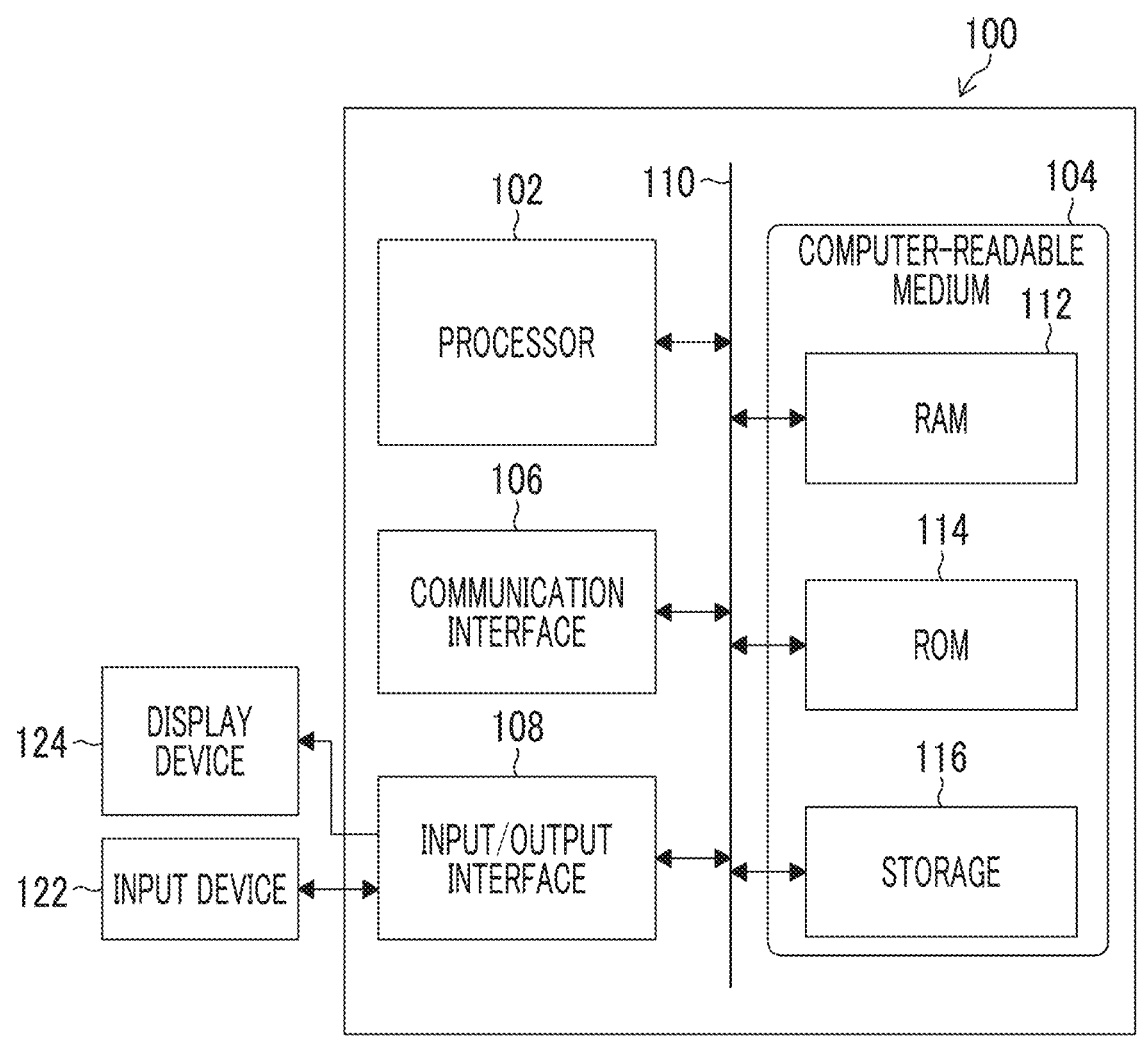
FIG. 2 is a block diagram showing an example of a hardware configuration of a control device that controls the ink jet printer.

Although not shown in FIG. 1, in addition to the above-described configuration, the ink jet printer 1 includes a sorting unit 55 that sorts the printed material according to an inspection result based on the read image of the scanner 48 (see FIG. 2). For example, the sorting unit 55 is disposed downstream of the ink drying unit 50 and upstream of the accumulation unit 60 with respect to the transport direction of the paper P. The sorting unit 55 includes a stamper (not shown). The stamper is a device that performs stamping processing of attaching ink, which is a mark indicating a defective printed material, to the leading edge of the paper P which is a defective printed material detected by an inspection. The sorting unit 55 may include a mechanism of switching between transport paths so as to guide the defective printed material to a dedicated accumulation tray instead of or in combination with the stamper.

In addition, while illustration is not provided in FIG. 1, the ink jet printer 1 includes a maintenance unit that performs a maintenance treatment such as cleaning of the ink jet heads 46K, 46C, 46M, and 46Y. The maintenance unit is installed alongside the drawing drum 42 in an axial direction of the drawing drum 42.

Example of Hardware Configuration of Control Device

FIG. 2 is a block diagram showing an example of a hardware configuration of a control device 100 that controls the ink jet printer 1. For example, the control device 100 may be configured with a combination of hardware and software of a computer. The control device 100 includes a processor 102, a computer-readable medium 104 that is a non-transitory tangible object, a communication interface 106, and an input/output interface 108. The processor 102 includes a central processing unit (CPU). The processor 102 may include a graphics processing unit (GPU). The processor 102 is connected to the computer-readable medium 104, the communication interface 106, and the input/output interface 108 via a bus 110.

The computer-readable medium 104 includes, for example, a random access memory (RAM) 112, a read-only memory (ROM) 114, and a storage 116. The RAM 112 is a memory that functions as a main storage device. The storage 116 is an auxiliary storage device. The storage 116 may be, for example, a hard disk drive (HDD) device, a solid state drive (SSD) device, or a combination thereof. A part or all of a storage area of the computer-readable medium 104 may be included in the processor 102.

The computer-readable medium 104 stores a program, data, or the like for realizing functions of the control device 100. The term "program" includes the concept of a program module. A part of the processing functions of the control device 100 may be realized by using an integrated circuit represented by a digital signal processor (DSP) or a field programmable gate array (FPGA).

The control device 100 is connected to an input device 122 and a display device 124. The input device 122 is configured with, for example, a keyboard, a mouse, a multi-touch panel, other pointing devices, a sound input device, or an appropriate combination thereof. The display device 124 is configured with, for example, a liquid crystal display, an organic electro-luminescence (OEL) display, a projector, or an appropriate combination thereof. In addition, the input device 122 and the display device 124 may be integrally configured like a touch panel. The input device 122 and the display device 124 may be included in the control device 100, or the control device 100, the input device 122, and the display device 124 may be integrally configured.

Overview of Control System of Ink Jet Printer 1

Figure 3:
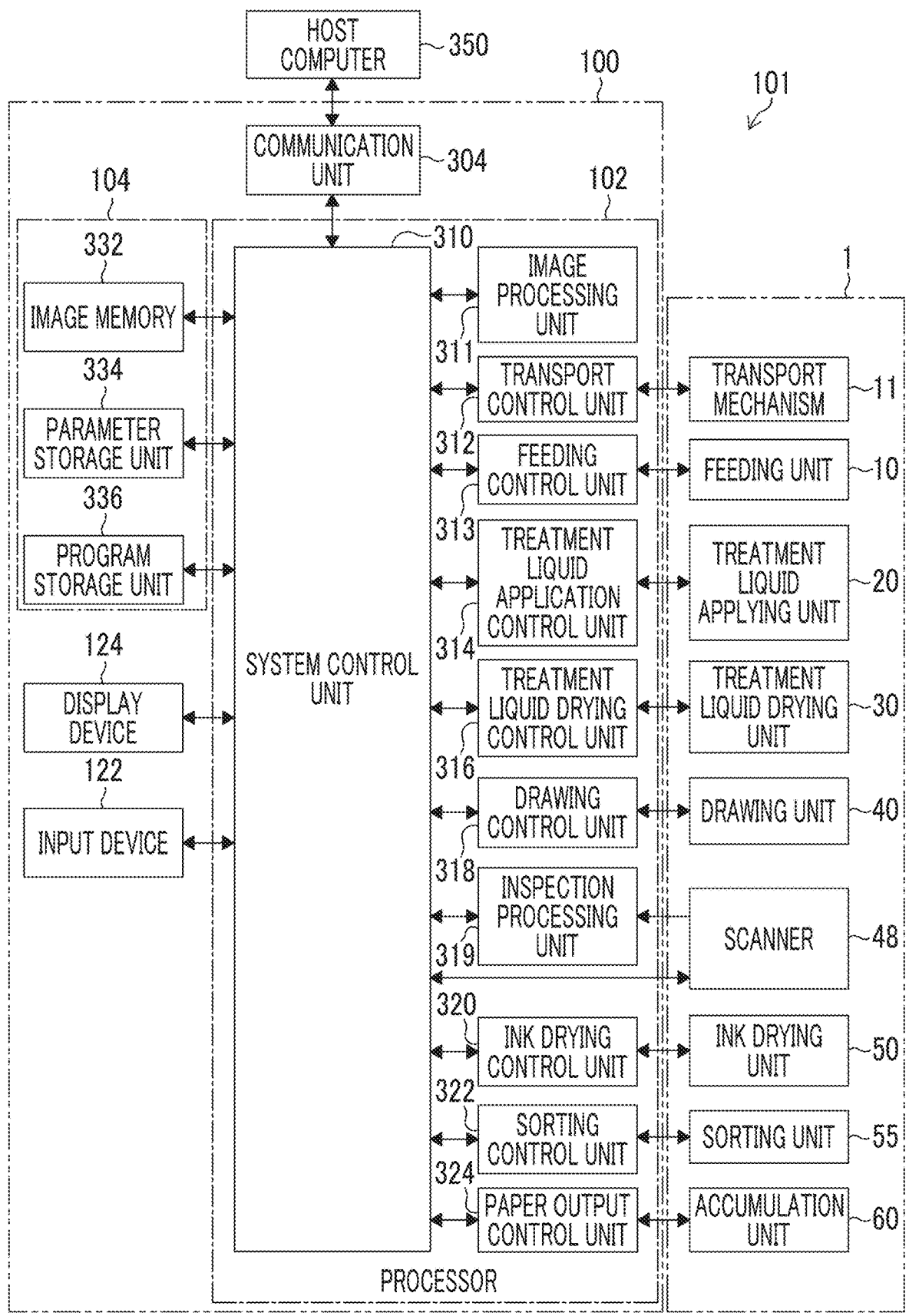
FIG. 3 is a functional block diagram schematically showing a configuration of a control system in a printing system including the ink jet printer and the control device.

FIG. 3 is a functional block diagram schematically showing a configuration of a control system in a printing system 101 including the ink jet printer 1 and the control device 100. The processor 102 functions as a processing unit and/or a control unit that performs various types of processing by executing a command of a program stored in the computer-readable medium 104. The processor 102 functions as a system control unit 310, an image processing unit 311, a transport control unit 312, a feeding control unit 313, a treatment liquid application control unit 314, a treatment liquid drying control unit 316, a drawing control unit 318, an inspection processing unit 319, an ink drying control unit 320, a sorting control unit 322, and a paper output control unit 324. A processing function of each of the units may be realized by using a plurality of processors.

The control device 100 includes a communication unit 304, an image memory 332, a parameter storage unit 334, and a program storage unit 336. The communication unit 304 includes the communication interface 106 (see FIG. 2). The control device 100 is connected to a host computer 350 via the communication unit 304 and can transmit and receive data to and from the host computer 350. The term "connection" as used here includes a wired connection, a wireless connection, or a combination thereof. The communication unit 304 may be equipped with a buffer memory for increasing a speed of communication processing. The communication unit 304 serves as an image input interface unit for acquiring image data representing an image as a printing target. A part of functions of the communication unit 304 may be realized by the processor 102.

The image data acquired from the host computer 350 via the communication unit 304 is stored in the image memory 332. The image memory 332 functions as a temporary storage unit for various types of data including the image data.

The parameter storage unit 334 stores various parameters used in the ink jet printer 1. Various parameters stored in the parameter storage unit 334 are read out via the processor 102 and set in each unit of the ink jet printer 1.

The program storage unit 336 stores programs used in each unit of the ink jet printer 1. Various programs stored in the program storage unit 336 are read out via the processor 102 and executed in each unit of the apparatus. The computer-readable medium 104 functions as the image memory 332, the parameter storage unit 334, and the program storage unit 336.

The system control unit 310 functions as an overall control unit that collectively controls each unit of the ink jet printer 1. In addition, the system control unit 310 functions as a calculation unit that performs various types of calculation processing. Furthermore, the system control unit 310 controls reading and writing of data in the computer-readable medium 104.

The image processing unit 311 performs various types of conversion processing, correction processing, and halftone processing on the image data as the printing target. The conversion processing includes a pixel count conversion, a gradation conversion, a color conversion, and the like. The correction processing includes a density correction including an unevenness correction for suppressing density unevenness, a non-jetting correction for suppressing visibility of an image defect due to a nozzle that fails in jetting, and the like. The halftone processing is generally a process of converting m-valued (m is an integer of 3 or more) multi-gradation image data into n-valued (n is an integer of 2 or more and less than m) data by quantization. For example, the multi-gradation image data of 8 bits (256 gradations) or more for each color is understood as substantially continuous gradation image data. The image processing unit 311 converts, for example, continuous gradation image data of each color of CMYK into dot data representing a multi-valued dot arrangement of three or more values in units of pixels.

The ink jet heads 46C, 46M, 46Y, and 46K of this example can be classified into three types of droplet sizes (dot sizes), a small droplet, a medium droplet, and a large droplet. In this case, the image processing unit 311 converts the continuous gradation image data layered for each color into a four-gradation (n=4) signal of "jet large droplet ink", "jet medium droplet ink", "jet small droplet ink", and "no jetting (no droplet)". For example, a dither method or an error diffusion method is applied to such halftone processing. Furthermore, the image processing unit 311 performs the correction processing based on the read image obtained from the scanner 48.

The transport control unit 312 controls an operation of a transport mechanism 11. The transport mechanism 11 includes elements of a mechanism related to the transportation of the paper P from the feeding unit 10 to the accumulation unit 60 described with reference to FIG. 1. The transport mechanism 11 includes the feeding drum 16, the treatment liquid coating drum 22, the treatment liquid drying drum 32, the drawing drum 42, the chain gripper 70, and the like shown in FIG. 1. In addition, the transport mechanism 11 includes a driving unit such as a motor (not shown) or a motor driving circuit (not shown) as a power source. The transport control unit 312 controls a transportation speed of the paper P by the transport mechanism 11 in response to a command from the system control unit 310, and performs control such that the paper P is transported from the feeding unit 10 to the accumulation unit 60.

The feeding control unit 313 operates the feeding unit 10 in response to a command from the system control unit 310. The feeding control unit 313 controls a supply start operation of the paper P, a supply pause operation of the paper P, and the like.

The treatment liquid application control unit 314 operates the treatment liquid applying unit 20 in response to a command from the system control unit 310. The treatment liquid application control unit 314 controls a coating operation of the treatment liquid coating device 24, such as ON/OFF of the precoating function, an application amount of the treatment liquid, and an application timing.

The treatment liquid drying control unit 316 operates the treatment liquid drying unit 30 in response to a command from the system control unit 310. The treatment liquid drying control unit 316 controls a drying temperature, a flow rate of a drying gas, a jetting timing of the drying gas, and the like.

The drawing control unit 318 operates the drawing unit 40 in response to a command from the system control unit 310. The drawing control unit 318 is configured to include a waveform storage unit, a waveform generation unit, and a driving circuit (not shown). The waveform storage unit stores a waveform of a driving voltage applied to jetting energy generating elements of the ink jet heads 46C, 46M, 46Y, and 46K. The waveform generation unit generates the waveform of the driving voltage. The driving circuit generates the driving voltage having a driving waveform corresponding to dot data.

The drawing control unit 318 controls a jetting operation of each of the ink jet heads 46C, 46M, 46Y, and 46K based on the dot data of each ink color generated through the halftone processing of the image processing unit 311 so that the image is recorded on the paper P transported by the drawing drum 42. That is, a jetting timing and an ink jetting amount for each pixel position are determined based on the dot data generated through the processing by the image processing unit 311, a driving voltage according to the jetting timing and the ink jetting amount for each pixel position and a control signal for determining a jetting timing for each pixel are generated, the driving voltage is supplied to the ink jet heads 46C, 46M, 46Y, and 46K, and dots are recorded on the paper P by the inks jetted from the ink jet heads 46C, 46M, 46Y, and 46K.

The ink drying control unit 320 operates the ink drying unit 50 in response to a command from the system control unit 310. The ink drying control unit 320 controls a temperature of a drying gas, a flow rate of the drying gas, a jetting timing of the drying gas, and the like.

The sorting control unit 322 controls the stamping processing by the stamper of the sorting unit 55 according to an inspection result of the inspection processing unit 319. The sorting control unit 322 executes the stamping processing on the paper P determined to be a defective printed material and does not perform the stamping processing on the paper P determined to be a non-defective (normal) printed material.

The paper output control unit 324 operates the accumulation unit 60 in response to a command from the system control unit 310. In a case where the accumulation device 62 shown in FIG. 1 includes an elevating mechanism, the paper output control unit 324 controls an operation of the elevating mechanism in response to an increase or decrease in sheets of paper P. The paper P, which is a printed material, is stacked in the accumulation tray 62A. Ink is attached to the leading edge of the paper P of the defective printed material. Therefore, a worker (operator) who is a user can specify the defective printed material from among sheets of paper P stacked in the accumulation tray 62A.

Information input via the input device 122 is sent to the system control unit 310. The system control unit 310 executes various types of processing in response to the information input from the input device 122.

The display device 124 may display various types of information such as various types of setting information of the apparatus or abnormality information in response to a command from the system control unit 310. The operator can set various parameters and input and edit various types of information by using the input device 122 while observing contents displayed on the display device 124. In addition, the inspection result by the inspection processing unit 319 may be displayed on the display device 124. The display device 124 functions as a unit for notifying of the inspection result. The user can set a utilization form of the inspection result, such as whether or not to display the inspection result on the display device 124 or whether or not to perform the stamping processing or to control of a paper output destination based on the inspection result, through an appropriate user interface. The control device 100 including the inspection processing unit 319 functions as the printed material inspection device.

Overview of Printed Material Inspection Method

In the inspection of a printed material performed in the present embodiment, inspection data is acquired by reading a printed material as an inspection target by the scanner 48, and the inspection data is compared with reference data as a reference of inspection. The reference data used in the present embodiment is digital image data acquired based on print data without performing printing. That is, the reference data is the digital image data itself of the printing target image indicated by the print data input to the printing system 101, or digital image data generated by performing appropriate processing on the digital image data.

In the present specification, the digital image data acquired based on the print data without performing printing is referred to as an "original image". The original image may be, for example, a raster image (bitmap image) layered for each color of CMYK from portable document format (PDF) input data by a raster image processor (RIP). A CMYK raster image may be input as the print data, and in this case, print data configured to include color information of inks used for printing corresponds to the original image.

The printed material as the inspection target is a printed material printed by the ink jet printer 1 based on the print data. In the present specification, an inspection target image obtained by reading the printed material as the inspection target by the scanner 48 is referred to as a "scanned image".

The scanned image is synonymous with a read image and is an example of a "captured image" in the embodiment of the present disclosure.

Figure 4:
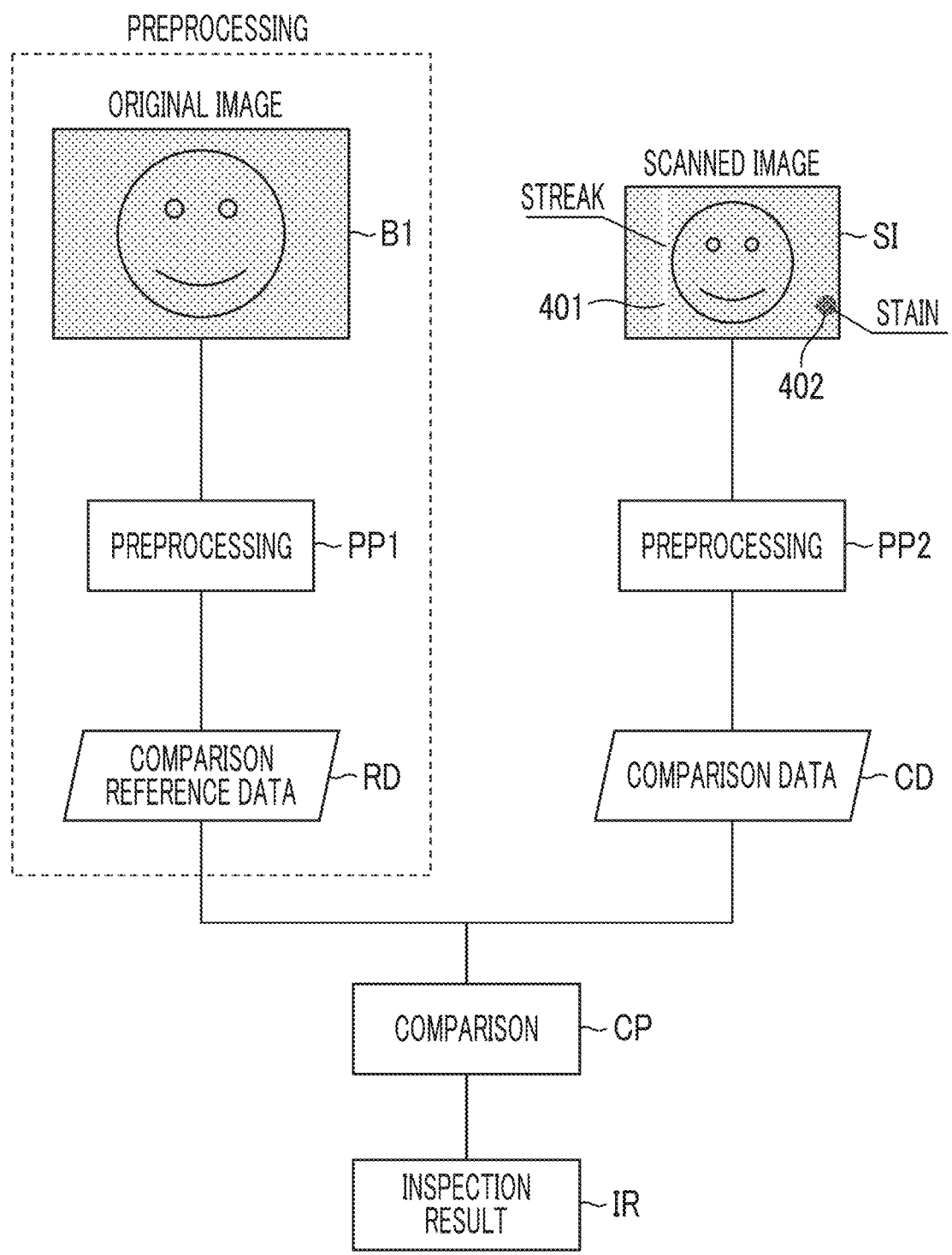
FIG. 4 is a flowchart showing an overview of inspection processing of comparing an original image to a scanned image.

FIG. 4 is a flowchart showing an overview of inspection processing of comparing an original image BI for printing to a scanned image SI obtained by scanning a printed image. In a case where the printed material is inspected, the original image BI and the scanned image SI cannot be directly compared as they are. While most original images BI for printing are configured to include CMYK color information, general optical sensors such as a CCD image sensor or a CMOS image sensor mounted in an imaging device such as the scanner 48 are configured to output RGB color information. That is, in many cases, the original image BI and the scanned image SI are different from each other in color information of the image data. Here, the image sensor that generates the scanned image SI is not limited to the primary color system sensor, and a complementary color system sensor may be used. CMYK is an example of a color space representing data of the original image BI, and RGB is an example of a color space representing data of the scanned image SI.

In addition, while the original image BI is configured to have a high resolution such as 1200 dpi×1200 dpi, for example, the scanner 48 becomes expensive in a case where the scanned image SI has a high resolution, and a resolution in the transport direction has to be lowered in a case where a printing speed is increased. For these reasons, the original image BI and the scanned image SI are also different from each other in resolution in many cases. For example, the scanned image SI is configured to have a resolution as low as 600 dpi×100 dpi. Furthermore, geometric noise, optical noise, noise caused by signals, or the like is applied to the scanned image SI due to an installation state of the scanner 48.

Therefore, before performing comparison processing between the original image BI and the scanned image SI, preprocessing for converting each of the images into data in a format that can be compared to each other is performed.

That is, the processor 102 performs preprocessing PP1 for an original image on the original image BI to generate comparison reference data RD. In addition, the processor 102 performs preprocessing PP2 for a scanned image on the scanned image SI to generate comparison data CD.

Thereafter, the processor 102 performs comparison processing CP for detecting a defect in a printed material based on the comparison reference data RD and the comparison data CD. Defect inspection information including at least one type of information of the presence or absence of a defect, a degree of the defect, or a position of the defect on the printed material can be obtained by the comparison processing CP.

The processor 102 outputs an inspection result IR based on the defect inspection information obtained by the comparison processing CP. The inspection result IR may include at least one type of information of the presence or absence of a defect, information indicating a degree of the defect, or information indicating a position of the defect. Such inspection processing needs to be performed within a very short time from the generation of the scanned image SI to the generation of a scanned image of a printed material as a next inspection target. In order to improve the accuracy of inspection, it is necessary to perform complex processing that enables a more detailed extraction of defects. However, performing the complex processing takes time. Furthermore, a plurality of types of defects may occur in the printed material due to various factors.

The scanned image SI shown in FIG. 4 is an example of an image obtained by imaging the printed material including a streak 401 and a stain 402 as examples of a typical defect that can occur in the printed material. The streak 401 can occur due to a jetting failure of a nozzle in the ink jet head. The stain 402 can occur due to ink dripping, adhesion of foreign substances, or the like. In a case of accurately inspecting not only the streak 401 and the stain 402 but also each of a plurality of types of defects, even more complex processing is performed. In addition, a method that uses a learning model such as deep learning for the inspection processing takes more processing time compared to an image processing method that does not use a learning model, so that it becomes more difficult to achieve both an improvement in processing speed and an improvement in accuracy.

Therefore, in the printed material inspection device according to the present embodiment, in order to detect a plurality of types of defects, different detection methods are adopted depending on a type of a defect as a detection target, a processing method suitable for detecting each defect is applied, and preprocessing for the original image BI is performed in advance. Here, the processing for the original image BI is, for example, image conversion processing such as image resolution conversion, CMYK-to-RGB conversion, and processing of adding the same noise as the noise of the scanned image SI, extraction of a feature amount in machine learning, or a combination thereof. By performing the processing for the original image BI in advance and holding a processing result before acquiring the scanned image SI, the number of processes for dynamic processing can be reduced, so that the processing speed can be improved.

That is, in the present embodiment, before a printing operation is started, the preprocessing PP1 for the original image BI from which information has already been obtained is performed in advance before acquiring the scanned image SI, so that the processing time is reduced. In addition, information compression is also possible through the preprocessing PP1, and instead of storing the original image BI itself, the comparison reference data RD subjected to the information compression is stored, which reduces a memory capacity required for storage. In a case where the information (comparison reference data RD) compressed by the preprocessing PP1 is stored, the data of the original image BI can be discarded in the printed material inspection device, so that a memory reduction effect is also achieved.

In the present specification, the preprocessing PP1 performed in advance on the original image BI is referred to as "preprocessing". A processing content of the preprocessing differs depending on a degree of difference between the original image BI and the scanned image SI, a type of a detection target defect, an inspection method, and the like. In addition, the processing content of the preprocessing PP2 for the scanned image SI also differs depending on the type of the detection target defect, the inspection method, and the like.

The flowchart shown in FIG. 4 is a processing flow for detecting a defect belonging to a specific type among a plurality of types of defects that can occur in a printed material. In the printed material inspection device according to the present embodiment, in order to detect a plurality of types of defects, the processing flow as shown in FIG. 4 is performed by applying different processing contents for each type of defect as a detection target (see FIG. 5).

Figure 5:
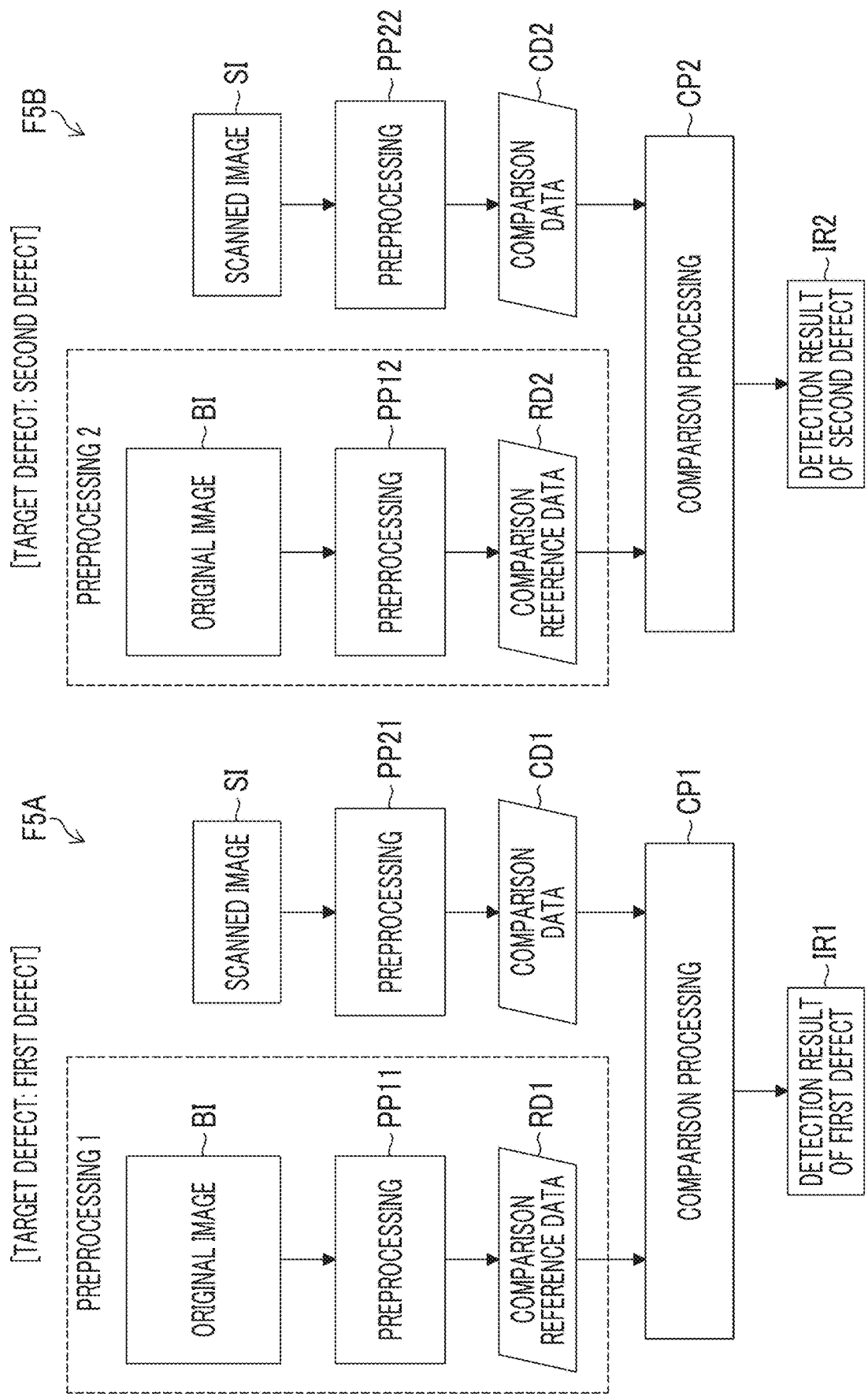
FIG. 5 is a flowchart showing an example of inspection processing corresponding to each of two types of defects.

FIG. 5 shows an example of a flowchart of inspection processing performed for each type of defect in a case where there are two types of defects as detection targets. A left diagram F5A of FIG. 5 is a flowchart of inspection processing of detecting a first defect, and a right diagram F5B of FIG. 5 is a flowchart of inspection processing of detecting a second defect. It is assumed that the first defect is, for example, a streak-shaped defect (hereinafter, referred to as a "streak defect"), and the second defect is a defect other than the streak defect (hereinafter, referred to as a "non-streak defect"). The second defect includes a defect of stains such as ink dripping. In FIG. 5, although the detection of two types of defects has been described as an example, the same applies to a case where three or more types of defects are each detected, in which a processing flow for each defect type corresponding to the type of the defect as a target is added. Each of the streak defect and the non-streak defect is an example of a "defect type" in the present disclosure.

As shown in FIG. 5, the processor 102 performs preprocessing PP11 and preprocessing PP12, which are different from each other, on the original image BI depending on the type of the target defect and holds comparison reference data RD1 and RD2, which are different from each other, depending on the type of the target defect.

That is, in a case where the original image BI is acquired, the processor 102 performs the preprocessing PP11 on the original image BI as first preprocessing for detecting a first defect to generate the comparison reference data RD1. The generated comparison reference data RD1 is held in the memory. In addition, the processor 102 performs the preprocessing PP12 on the original image BI as second preprocessing for detecting a second defect to generate the comparison reference data RD2. The generated comparison reference data RD2 is held in the memory.

Thereafter, the processor 102 acquires the scanned image SI, and performs preprocessing PP21 necessary for inspecting the first defect on the scanned image SI to generate comparison data CD1. The processor 102 performs comparison processing CP1 using the generated comparison data CD1 and the comparison reference data RD1 held in the memory in advance, and outputs a detection result IR1 of the first defect.

Similarly, the processor 102 performs preprocessing PP22 necessary for inspecting the second defect on the scanned image SI to generate comparison data CD2. Here, an aspect can also be adopted in which the scanned image SI is used as it is as the comparison data CD2 without performing the preprocessing PP22.

The processor 102 performs comparison processing CP2 using the generated comparison data CD2 and the comparison reference data RD2 held in the memory in advance, and outputs a detection result IR2 of the second defect.

Regarding the preprocessing to be performed on the original image BI, for example, in a case where the detection target defect is a thin and fine defect such as a streak, a method of extracting fine features by deep learning is effective. Meanwhile, in a case of a somewhat large defect such as a stain caused by ink dripping, configurations of respective pieces of data of the original image BI and the scanned image SI are brought close to each other by image conversion such as image resolution conversion or blurring processing without using deep learning, and a defect is extracted by performing difference processing in units of corresponding pixels, whereby faster processing can be achieved.

In a case where deep learning is used in the comparison processing CP1 as the inspection method, in order to compare respective feature amounts of the original image BI and the scanned image SI to each other, extraction of the feature amounts is performed as the preprocessing PP11 and the preprocessing PP21. The processing of extracting a feature amount from an image may be performed using machine learning, or may be performed by designing a feature amount extraction algorithm other than the machine learning. In a case where feature amount extraction is performed using machine learning, the extraction may be performed using deep learning.

In the case of deep learning, feature amount extraction takes time. Therefore, an effect of reducing a processing time by performing the preprocessing 1 on the original image BI is large. In particular, in a case where a feature amount of an image is compressed into a one-dimensional vector, the amount of data can be more significantly reduced compared to the original image BI of two-dimensional×4 channels (CMYK), and in a case where the feature amount of the image is held in a state of the feature amount as the comparison reference data RD1, a memory reduction effect is large.

Figure 6:
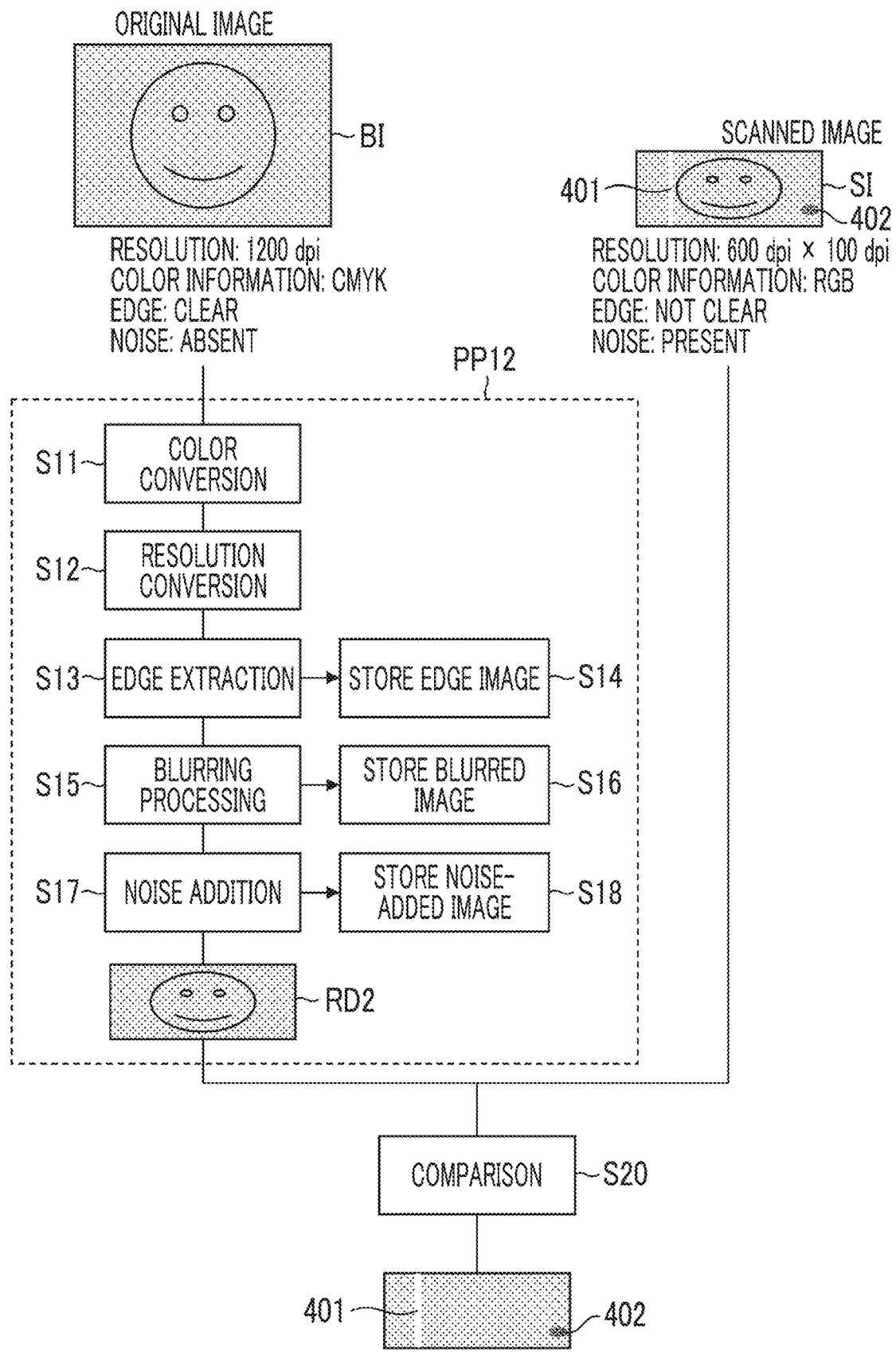
FIG. 6 is a flowchart showing an example of inspection processing in a case where the original image and the scanned image are compared to each other in units of pixels.

On the other hand, as another inspection method, in a case of performing comparison in units of pixels, such as difference processing between the comparison reference data RD2 generated from the original image BI and the comparison data CD2 obtained based on the scanned image SI, as preprocessing 2 (preprocessing PP12) for the original image BI, for example, image processing such as resolution conversion, CMYK-to-RGB conversion, and edge processing is performed (see FIG. 6).

In addition, in order to achieve a higher speed, it is preferable that processing of bringing the original image BI close to the scanned image SI is performed to enable the scanned image SI to be compared as it is. This can be realized by performing processing of adding noise included in the scanned image SI to the original image BI (see FIG. 7). The noise included in the scanned image SI includes geometric noise such as an installation position or component accuracy, optical noise, and signal noise caused by an optical sensor, and the noise to be added may be any one or all of a plurality of the noises.

Furthermore, in a case where a defect is extracted by the difference processing between pieces of image data in units of pixels as the comparison processing CP2, it is necessary to remove a feature of the image other than the defect. Therefore, it is desirable to hold an edge image, which has been subjected to the blurring processing for removing features of edge portions of the original image BI and edge extraction processing for specifying common edge positions between the scanned image SI and the original image BI.

As the processing performed in advance on the original image BI to bring the original image BI close to a data configuration of the scanned image SI, at least one of various processes such as resolution conversion processing, color conversion processing, edge extraction processing, blurring processing, or noise addition processing may be performed.

FIG. 6 is a flowchart showing an example of the inspection processing in a case where the original image BI and the scanned image SI are compared to each other in units of pixels. It is assumed that the original image BI has, for example, a resolution of 1200 dpi×1200 dpi and CMYK color information. Since the original image BI acquired based on the print data is a digital image that is not derived from a captured image of a printed material, the original image BI has a clear edge of a pattern and does not include noise.

On the other hand, it is assumed that the scanned image SI has, for example, a resolution of 600 dpi×100 dpi and RGB color information. The scanned image SI is derived from a captured image of a printed material, has a less clear edge than the original image BI, and includes noise such as geometric noise and optical noise.

As described above, the original image BI and the scanned image SI that have significantly different data configurations cannot be compared to each other as they are in units of pixels in this state. Therefore, the processor 102 performs the preprocessing PP12 on the original image BI to convert the original image BI into the comparison reference data RD2 that can be compared to the scanned image SI in units of pixels.

The preprocessing PP12 shown in FIG. 6 includes processing from step S11 to step S18 described below.

In step S11, the processor 102 performs the color conversion processing. The color conversion processing P11 described here may be CMYK-to-RGB conversion processing of converting CMYK color information into RGB color information.

In step S12, the processor 102 performs the resolution conversion processing. The resolution conversion processing may be processing of converting data of 1200 dpi×1200 dpi into data of 600 dpi×100 dpi, which is the same as the scanned image SI.

In step S13, the processor 102 performs the edge extraction processing. The edge extraction processing may be processing of extracting edges from an image which has been converted through the color conversion processing (step S11) and the resolution conversion processing (step S12).

The processor 102 stores the edge image obtained by the edge extraction processing (step S13) in the memory (step S14). The edge image is an example of "edge extraction data" in the embodiment of the present disclosure.

In step S15, the processor 102 performs the blurring processing on the image that has been converted through the color conversion processing (step S11) and the resolution conversion processing (step S12). The processor 102 stores the blurred image obtained by the blurring processing (step S15) in the memory (step S16). The blurred image is an example of "blurring-processed data" in the embodiment of the present disclosure.

In step S17, the processor 102 performs the noise addition processing. The noise addition processing may be processing of adding noise similar to the scanned image SI in a pseudo manner to the image that has been converted through the color conversion processing (step S11), the resolution conversion processing (step S12), and the blurring processing (step S15). The processor 102 stores the noise-added image obtained by the noise addition processing (step S17) in the memory (step S18).

The noise-added image obtained by the noise addition processing (step S17) may be held as the comparison reference data RD2.

By performing the preprocessing (preprocessing PP12) on the original image BI before acquiring the scanned image SI, it is possible to suppress the processing time after acquiring the scanned image SI.

In a case where the scanned image SI is acquired, the processor 102 performs, on the scanned image SI, edge processing of removing an edge derived from the pattern of the original image BI by using the edge image extracted from the original image BI. In addition, the processor 102 performs the blurring processing on the scanned image SI. In this manner, the processor 102 generates the comparison data from the scanned image SI.

Then, in step S20, the processor 102 performs the comparison processing of comparing the stored comparison reference data RD2 to the comparison data generated from the scanned image SI in units of pixels. The comparison processing may be, for example, difference processing of calculating a difference between the two in units of pixels to generate a difference image.

In a case where the scanned image SI in which a printed material with a defect is imaged is obtained, the defect is detected by the comparison processing in step S20, and the defect information is obtained.

Figure 7:
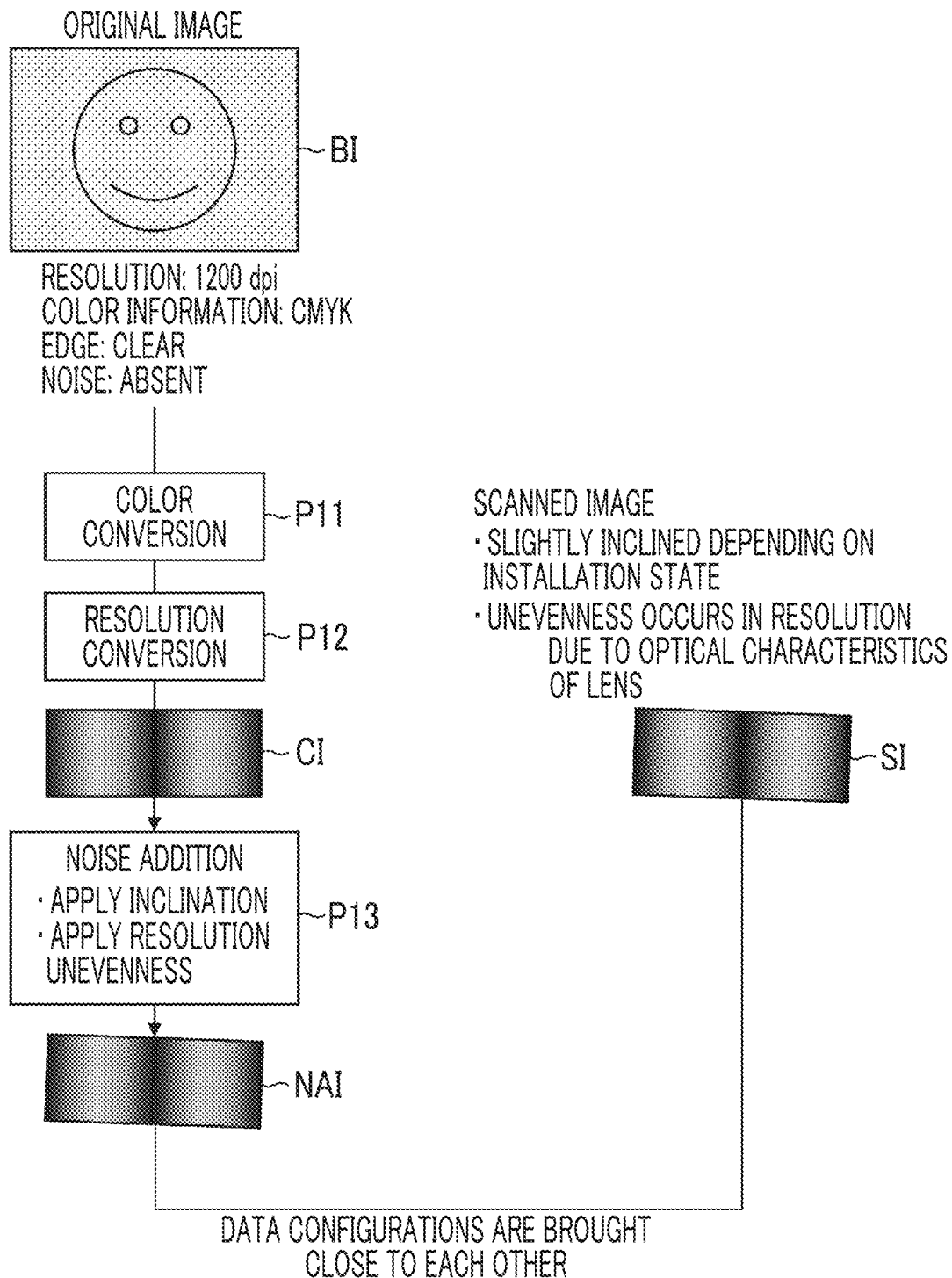
FIG. 7 is an explanatory diagram showing an example of noise addition processing for the original image.

FIG. 7 is an explanatory diagram showing an example of the noise addition processing for the original image BI. The image of the scanned image SI is slightly inclined depending on the installation state of the scanner 48. In addition, unevenness occurs in the resolution of the scanned image SI due to the optical characteristics of the scanner 48. In order to bring the data configuration of the original image BI close to the data configuration of the scanned image SI including the geometric noise and the optical noise, the processor 102 performs the preprocessing including the color conversion processing P11, the resolution conversion processing P12, and the noise addition processing P13 on the original image BI. The color conversion processing P11 and the resolution conversion processing P12 are the processing described in step S11 and step S12 in FIG. 6.

The noise addition processing P13 includes rotation processing of applying the same inclination as the inclination of the scanned image SI to the converted image CI obtained by performing the color conversion processing P11 and the resolution conversion processing P12 on the original image BI, and image processing of applying the same resolution unevenness as the resolution unevenness of the scanned image SI to the converted image CI.

The data configuration of a noise-added image NAI obtained by performing the noise addition processing P13 on the converted image CI is close to the data configuration of the scanned image SI. The noise-added image NA is an example of "conversion data" in the embodiment of the present disclosure.

Example of Processing Corresponding to Type of Defect as Detection Target

Figure 8:
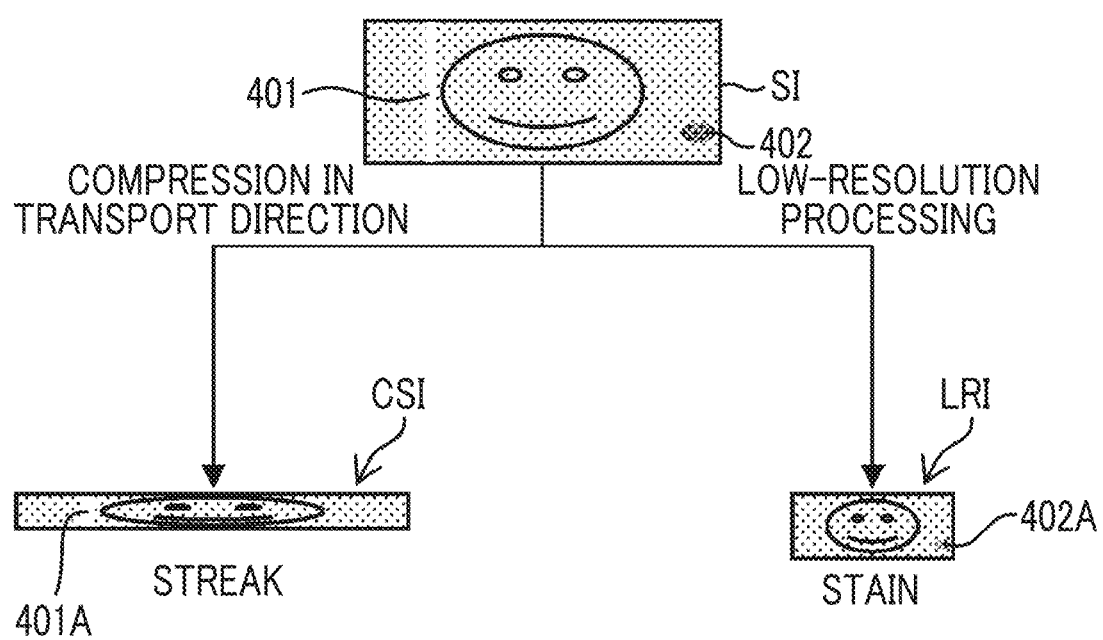
FIG. 8 is an explanatory diagram showing an example of processing for each type of defect as a detection target.

FIG. 8 is an explanatory diagram showing an example of processing for each type of defect as a detection target. As described above, in addition to the streak defect, a plurality of types of defects such as spot-like defects due to stains and the like can occur in the printed material. In a case where a defect as a target to be detected by the inspection of the printed material is, for example, a streak defect due to a jetting failure of the nozzle, since the streak extends in a long line in the transport direction of the paper P during the printing, a streak feature 401A which is a feature amount of the streak 401 in a compressed image CSI does not disappear even in a case where the information of the scanned image SI is compressed in the transport direction. On the other hand, in a case where the information of the scanned image SI is compressed in the transport direction, the feature amount of the stain 402 in the compressed image CSI is reduced, so that it is difficult to detect a non-streak defect such as a stain from the compressed image CSI.

In a case where the defect as the target to be detected is, for example, a relatively large spot-like stain 402 caused by ink dripping or the like, even though the scanned image SI undergoes down-conversion processing (low-resolution processing), a stain feature 402A, which is the feature amount of the stain 402, does not disappear in a low-resolution image LRI. On the other hand, in a case where the scanned image SI is processed to have a low resolution, the feature amount of the streak 401 in the low-resolution image LRI disappears, so that it is difficult to detect the streak defect from the low-resolution image LRI.

Therefore, in a case where a streak defect is detected, processing of compressing information in the transport direction is performed on the scanned image SI, and in a case where a non-streak defect, such as stain, is detected, it is preferable that the scanned image SI is processed to have a low resolution.

As described above, by appropriately using different types of processing depending on the type of the defect as the detection target, it is possible to ensure the accuracy of detection and to reduce a data storage capacity. The defect type may be defined from the viewpoint of whether the same processing method is applied as a defect detection processing method or different processing methods are applied.

Functional Configuration of Printed Material Inspection Device

Figure 9:
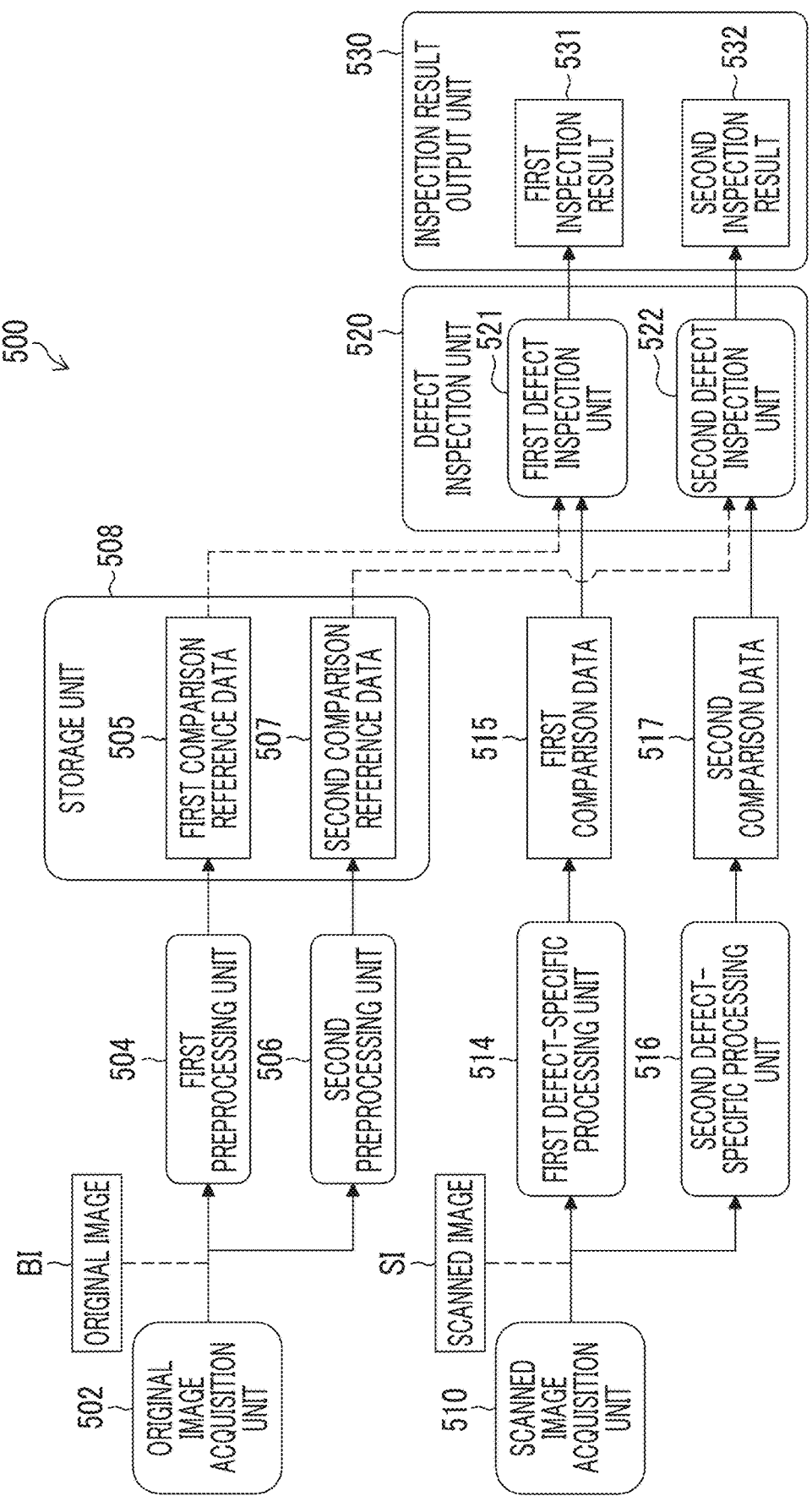
FIG. 9 is a block diagram showing a functional configuration of a printed material inspection device according to the embodiment.

FIG. 9 is a block diagram showing a functional configuration of a printed material inspection device 500 according to the embodiment. Here, an example of processing of detecting two types of defects, a streak defect and another type of defect (hereinafter, referred to as a non-streak defect) as an example of the plurality of types of defects as the detection target will be described.

The printed material inspection device 500 includes an original image acquisition unit 502, a first preprocessing unit 504, a second preprocessing unit 506, a storage unit 508, a scanned image acquisition unit 510, a first defect-specific processing unit 514, a second defect-specific processing unit 516, a defect inspection unit 520, and an inspection result output unit 530. Functions of the printed material inspection device 500 are realized by a combination of hardware and software of a computer including one or more processors and one or more storage devices. The functions of the printed material inspection device 500 may be incorporated into the control device 100. In addition, the printed material inspection device 500 may be configured as an attached device connected to the control device 100.

The original image acquisition unit 502 acquires an original image BI. The first preprocessing unit 504 performs first preprocessing on the original image BI to generate first comparison reference data 505 from the original image BI. The first preprocessing is preprocessing for detecting the streak defect as a first defect as the detection target. The first preprocessing corresponds to the preprocessing PP11 described with reference to FIG. 5, and the first comparison reference data 505 corresponds to the comparison reference data RD1 described with reference to FIG. 5. The first preprocessing unit 504 is configured by using, for example, a trained deep learning model which is trained to extract the feature amount of the original image BI. The deep learning model may be, for example, a convolutional neural network (CNN). In this case, the first comparison reference data 505 may be feature amount data output from the deep learning model. Feature amount extraction processing performed by the first preprocessing unit 504 is an example of "first feature amount extraction processing" in the embodiment of the present disclosure.

The first preprocessing unit 504 is not limited to the processing using the deep learning, and may be configured to perform processing of extracting the feature amount by an algorithm other than the deep learning. It is preferable that the first preprocessing unit 504 is configured to perform image processing including image information compression processing (processing of compressing an image in the transport direction of the paper P) suitable for detecting the streak defect described with reference to FIG. 8. The first comparison reference data 505 generated by the first preprocessing unit 504 is stored in the storage unit 508.

Similarly, the second preprocessing unit 506 performs second preprocessing that is different from the first preprocessing on the original image BI to generate second comparison reference data 507 from the original image BI. The second preprocessing is preprocessing for detecting a non-streak defect as the second defect as the detection target. The second preprocessing corresponds to the preprocessing PP12 described with reference to FIG. 5, and the second comparison reference data 507 corresponds to the comparison reference data RD2 described with reference to FIG. 5. The second comparison reference data 507 generated by the second preprocessing unit 506 is stored in the storage unit 508. The storage unit 508 may be a storage area of the computer-readable medium 104.

The scanned image acquisition unit 510 acquires the scanned image SI read by the scanner 48. The first defect-specific processing unit 514 performs first defect-specific processing on the scanned image SI to generate first comparison data 515 from the scanned image SI. The first defect-specific processing corresponds to the preprocessing PP21 described with reference to FIG. 5, and the first comparison data 515 corresponds to the comparison data CD1 described with reference to FIG. 5.

The first defect-specific processing unit 514 is configured by using, for example, a trained deep learning model which is trained to extract the feature amount of the scanned image SI. The deep learning model may be, for example, a CNN. In this case, the first comparison data 515 may be feature amount data output from the deep learning model. Feature amount extraction processing performed by the first defect-specific processing unit 514 is an example of "second feature amount extraction processing" in the embodiment of the present disclosure.

The first defect-specific processing unit 514 is not limited to the processing using the deep learning, and may be configured to perform processing of extracting the feature amount by an algorithm other than the deep learning. It is preferable that the first defect-specific processing unit 514 is configured to perform image conversion processing including image information compression processing suitable for detecting the streak defect described with reference to FIG. 8.

The second defect-specific processing unit 516 performs second defect-specific processing on the scanned image SI to generate second comparison data 517 from the scanned image SI. The second defect-specific processing corresponds to the preprocessing PP22 described with reference to FIG. 5, and the second comparison data 517 corresponds to the comparison data CD2 described with reference to FIG. 5. It is preferable that the second defect-specific processing unit 516 is configured to perform image conversion processing including the low-resolution processing suitable for detecting defects such as the stain described with reference to FIG. 8.

The defect inspection unit 520 includes a first defect inspection unit 521 and a second defect inspection unit 522 respectively corresponding to two types of target defects. The first defect inspection unit 521 performs processing for detecting the first defect (here, the streak defect) using the first comparison data 515 and the first comparison reference data 505 held in the storage unit 508. That is, the first defect inspection unit 521 performs the comparison processing CP1 described with reference to FIG. 5. For example, the first defect inspection unit 521 may be configured to determine the presence or absence of a defect or to estimate a degree of the defect or a position of the defect by using a learning model in which machine learning such as deep learning is used, or may also be configured to calculate a difference between the first comparison data 515 and the first comparison reference data 505. A first inspection result 531 regarding the first defect is obtained by the processing in the first defect inspection unit 521.

The second defect inspection unit 522 performs processing for detecting the second defect (here, a defect other than the streak defect) using the second comparison data 517 and the second comparison reference data 507 held in the storage unit 508. That is, the second defect inspection unit 522 performs the comparison processing CP2 described with reference to FIG. 5. For example, the second defect inspection unit 522 may be configured to determine the presence or absence of a defect or to estimate a degree of the defect or a position of the defect by using a learning model in which machine learning such as deep learning is used, or may also be configured to calculate a difference between the second comparison data 517 and the second comparison reference data 507. A second inspection result 532 regarding the second defect is obtained by the processing in the second defect inspection unit 522.

The inspection result output unit 530 performs processing of outputting an inspection result including the first inspection result 531 and the second inspection result 532 obtained by the processing in the defect inspection unit 520. The inspection result output unit 530 performs processing of displaying the inspection result on the display device 124, for example, in a case where at least one of the first defect or the second defect is detected by the defect inspection unit 520. In a case where no defect is detected, the display of the inspection result may be omitted.

In addition, the inspection result output unit 530 may be configured to output a defect detection signal to the sorting control unit 322 in a case where at least one defect of the first defect or the second defect is detected by the defect inspection unit 520. The sorting control unit 322 controls the stamping processing or the paper transport path according to the defect detection signal.

The preprocessing performed by each of the first preprocessing unit 504 and the second preprocessing unit 506 is an example of a "plurality of types of preprocessing" in the embodiment of the present disclosure. The first comparison reference data 505 and the second comparison reference data 507 are examples of a "plurality of pieces of comparison reference data" in the embodiment of the present disclosure. The first comparison data 515 and the second comparison data 517 are examples of a "plurality of pieces of comparison data" according to the present disclosure.

Overview of Inspection Processing Using Deep Learning

Figure 10:
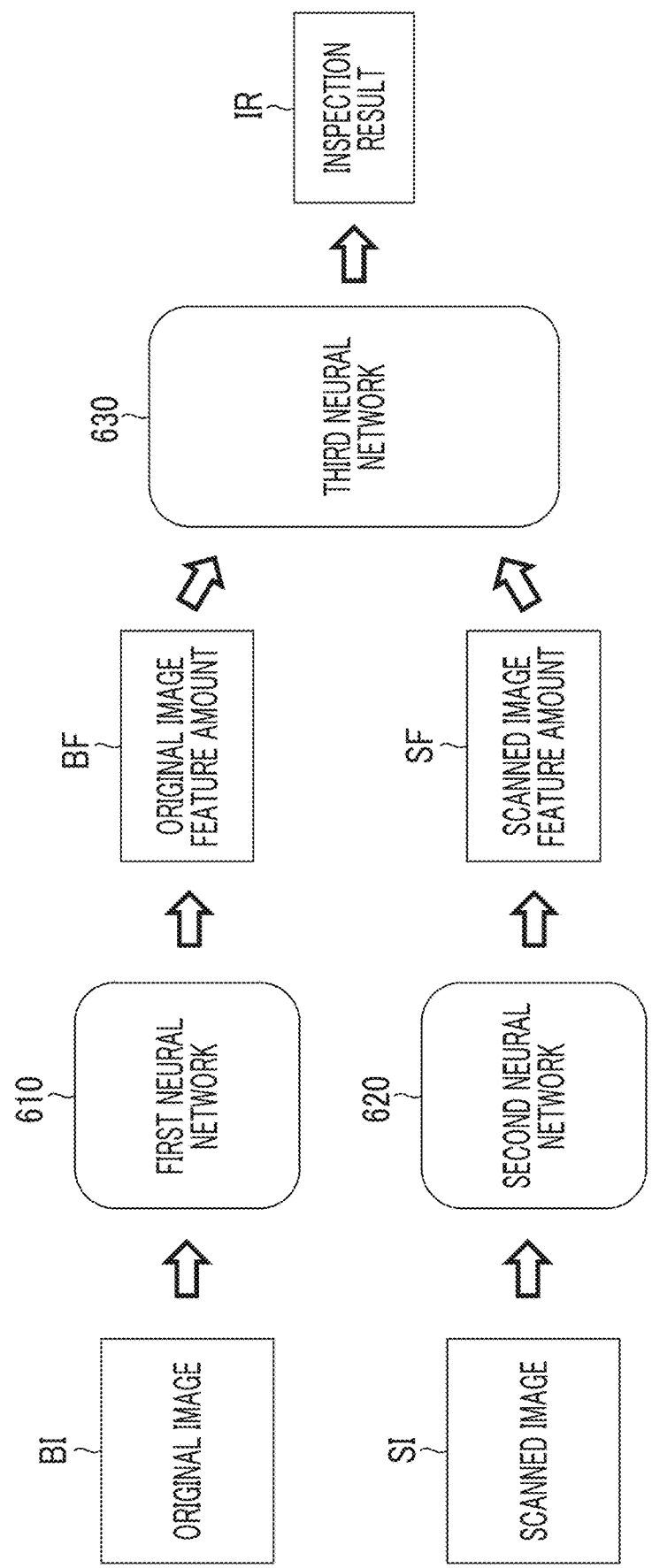
FIG. 10 is an explanatory diagram showing an example of inspection processing using deep learning.

FIG. 10 is an explanatory diagram showing an example of the inspection processing using deep learning. The printed material inspection device 500 may be configured to include, for example, a first neural network 610 that extracts the feature amount of the original image BI, a second neural network 620 that extracts the feature amount of the scanned image SI, and a third neural network 630 that compares an original image feature amount BF output from the first neural network 610 and a scanned image feature amount SF output from the second neural network 620 to each other.

The first neural network 610 may be a trained model that is configured as, for example, a CNN, and is trained to receive an original image BI, to extract a feature amount indicating an image feature of the original image BI, and to output the original image feature amount BF. Alternatively, the first neural network 610 may be a trained model that is trained to receive a converted image obtained by performing the image conversion processing including the resolution conversion, the CMYK-to-RGB conversion, and the compression in the transport direction on the original image BI, to extract a feature amount from the converted image, and to output the original image feature amount BF. It is preferable that the original image feature amount BF output from the first neural network 610 is in a one-dimensional vector data format.

The second neural network 620 may be, for example, a trained model that is configured as a CNN, and is trained to receive the scanned image SI, to extract a feature amount from the scanned image SI, and to output the scanned image feature amount SF. Alternatively, the second neural network 620 may be a trained model that is trained to receive a converted image obtained by performing the image conversion processing including the compression in the transport direction on the scanned image SI, to extract a feature amount from the converted image, and to output the scanned image feature amount SF.

It is preferable that the scanned image feature amount SF output from the second neural network 620 is a one-dimensional vector data format similarly to the original image feature amount BF.

The third neural network 630 may be a trained model that is trained to receive the original image feature amount BF output from the first neural network 610 and the scanned image feature amount SF output from the second neural network 620 and to output the inspection result IR of the defect. The inspection result IR includes at least one information of the presence or absence of a defect, a degree of the defect, or a position of the defect. The information indicating the presence or absence of a defect may be, for example, a binary discrete value indicating the presence or absence of a defect. The binary discrete value can be defined such that a case where there is no defect (in a case where a defect does not exist) is "0" and a case where there is a defect is "1".

In addition, the information indicating the degree of the defect may be, for example, continuous values indicating the degree of the defect. The degree of the defect represents the visibility of the defect, and a case where there is no defect can be set to "0" while a case where there is a defect can be defined as a continuous value ranging from 0 to 10 by setting a larger defect degree, that is, a more visible defect to a larger numerical value. In this case, the third neural network 630 performs regression for predicting the numerical value indicating the degree of the defect.

Alternatively, the information indicating the degree of the defect may be defined as a ternary or higher discrete value into which the degree of the defect is classified. For example, the degree of the defect may be defined by categorized ternary discrete values of 0, 1, and 2. In a case where there is no defect, a degree of the defect may be set to 0, in a case where there is a small defect, a degree of the defect may be set to 1, and in a case where there is a large defect, a degree of the defect may be set to 2. In this case, the third neural network 630 classifies three classes.

The information indicating the position of the defect may be defined as, for example, numerical data of position coordinates on the image, or as image information (binary image) with "0" for a non-defect position and "1" for a defect position.

The third neural network 630 may be configured to output a plurality of types of information including two pieces of information of the presence or absence of a defect, a degree of a defect, and a position of a defect.

A network structure of the third neural network 630 can have various forms depending on information to be output to the third neural network 630.

The first neural network 610 is applied to the first preprocessing unit 504 in FIG. 9. The original image feature amount BF corresponds to the first comparison reference data 505.

The second neural network 620 is applied to the first defect-specific processing unit 514 in FIG. 9. The scanned image feature amount SF corresponds to the first comparison data 515.

The third neural network 630 is applied to the first defect inspection unit 521 in FIG. 9. The inspection result IR corresponds to the first inspection result 531.

Training Method

In a training phase, the entire network in which the first neural network 610, the second neural network 620, and the third neural network 630 shown in FIG. 10 are combined is used as one model, and parameters of each of the first neural network 610, the second neural network 620, and the third neural network 630 are optimized so that a correct inspection result is output.

A training data set includes a plurality of data sets in which a plurality of training original images, a plurality of training scanned images corresponding to each of the plurality of training original images, and correct defect information for each of the plurality of training scanned images are associated with each other. It is preferable that the plurality of training scanned images are prepared for one training original image.

During training, a training original image of a data set sampled from the training data set is input to the first neural network 610, and a feature amount of the training original image is output from the first neural network 610. In addition, the training scanned image is input to the second neural network 620, and a feature amount of the training scanned image is output from the second neural network 620.

In addition, the third neural network 630 receives two feature amounts including the feature amount output from the first neural network 610 and the feature amount output from the second neural network 620 and outputs defect information estimated from a combination of the feature amounts. The estimated defect information output from the third neural network 630 may be an estimated value of the defect information including at least one information of the presence or absence of a defect, a degree of the defect, or a position of the defect.

A machine learning system (not shown) that executes learning processing updates the parameters of each of the first neural network 610, the second neural network 620, and the third neural network 630 so that the estimated defect information output from the third neural network 630 approaches the correct defect information. That is, the machine learning system calculates an updated amount of the parameters of each of the neural networks so that an error between the estimated defect information and the correct defect information is reduced by using a backpropagation method, and updates the parameters.

The machine learning system may perform mini-batch learning in which the parameters are updated in units of mini-batches, or may perform on-line learning in which the parameters are updated for each piece of training data.

After the training, each of the first neural network 610, the second neural network 620, and the third neural network 630 can be separately used as a trained model. The trained first neural network 610 can be used as a feature amount extractor that extracts the feature amount of the original image BI. The trained second neural network 620 can be used as a feature amount extractor that extracts the feature amount of the scanned image SI. The trained third neural network 630 can be used as a comparison processor that compares the feature amounts to each other to detect a defect.

The first neural network 610 is an example of a "first deep learning model" in the embodiment of the present disclosure. The second neural network 620 is an example of a "second deep learning model" in the embodiment of the present disclosure. The third neural network 630 is an example of a "third deep learning model" in the embodiment of the present disclosure. In FIG. 10, although the deep learning is described as an example, a machine learning model other than deep learning, such as a random forest or a support vector machine, may be applied instead of the deep learning model.

Operation of Printing System 101 Including Printed Material Inspection Device 500

Figure 11:
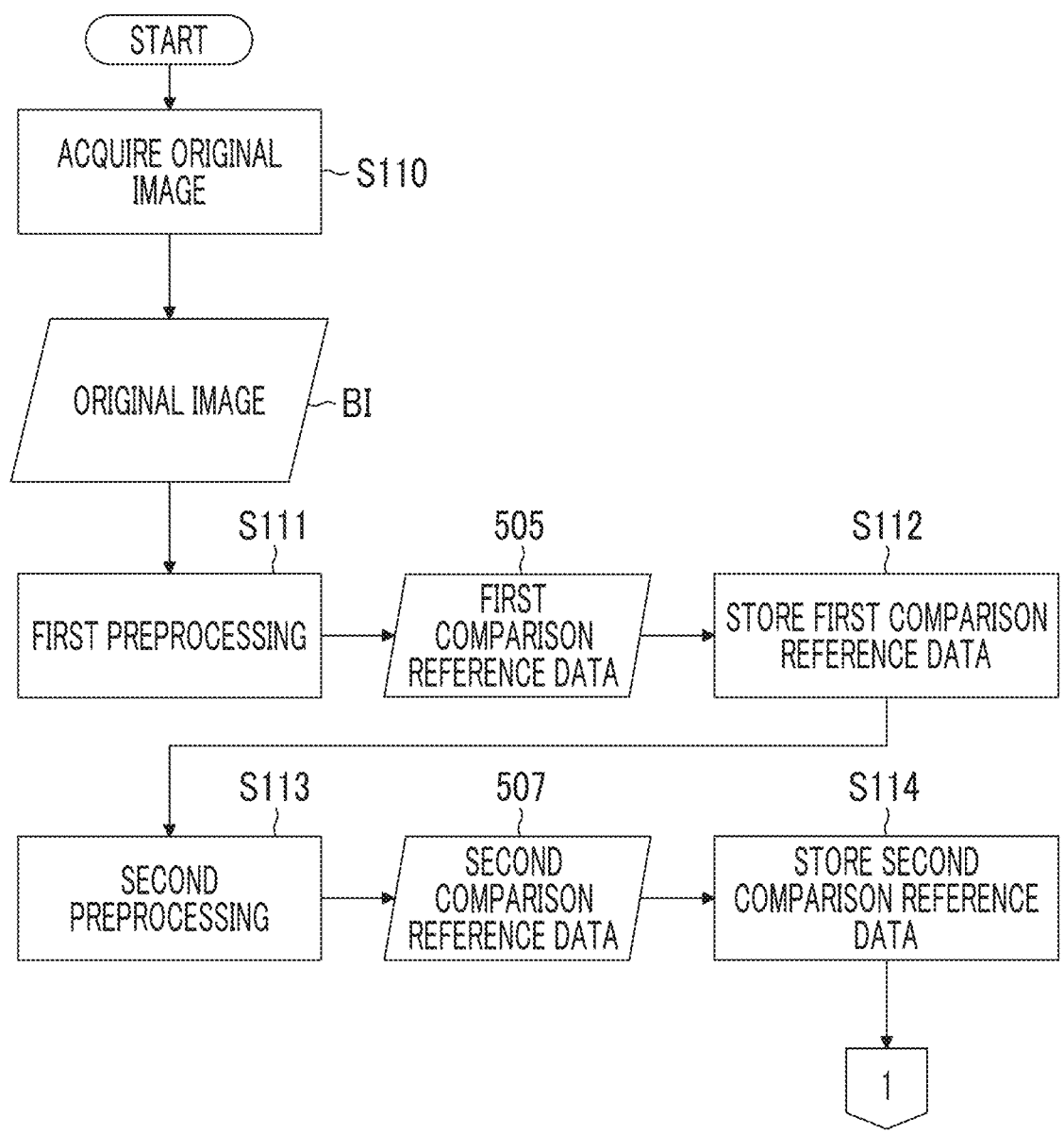
FIG. 11 is a flowchart showing an example of an operation of the printing system including the printed material inspection device according to the embodiment.

FIGS. 11 and 12 are flowcharts showing an example of an operation of the printing system 101 including the printed material inspection device 500.

In step S110, the processor 102 acquires the original image BI.

In step S111, the processor 102 performs the first preprocessing on the original image BI to generate the first comparison reference data 505. The first preprocessing may be processing including, for example, the resolution conversion processing and the CMYK-to-RGB conversion processing described with reference to FIG. 6, the compression processing in the transport direction described with reference to FIG. 8, and the feature amount extraction processing of extracting a feature amount from a compressed image of the original image BI by inputting a compressed image obtained by the compression processing to the deep learning model such as the first neural network 610 (see FIG. 10).

In step S112, the processor 102 stores the first comparison reference data 505 in the storage unit 508.

In step S113, the processor 102 performs the second preprocessing on the original image BI to generate the second comparison reference data 507. The second preprocessing may be processing including, for example, the resolution conversion processing, the CMYK-to-RGB conversion processing, the edge processing, the blurring processing, and the noise addition processing described with reference to FIG. 6 and the low-resolution processing described with reference to FIG. 8.

In step S114, the processor 102 stores the second comparison reference data 507 in the storage unit 508.

The processing from step S110 to step S114 can be performed before starting a printing operation by acquiring the print data. After step S114, the processor 102 proceeds to step S120 in FIG. 12.

In step S120, the processor 102 controls the ink jet printer 1 based on the original image BI to execute printing.

In step S121, the processor 102 controls the scanner 48 to execute imaging of the printed material.

In step S122, the processor 102 acquires the scanned image SI obtained by imaging the printed material with the scanner 48.

In step S123, the processor 102 performs the first defect-specific processing on the scanned image SI to generate the first comparison data 515. The first defect-specific processing may be processing including, for example, the compression processing in the transport direction described with reference to FIG. 9, and the feature amount extraction processing of extracting a feature amount from a compressed image by inputting a compressed image CSI obtained by the compression processing to the deep learning model such as the second neural network 620 (see FIG. 10).

In step S124, the processor 102 performs the first defect inspection processing by using the first comparison data 515 and the first comparison reference data 505 held in the storage unit 508 to obtain an inspection result (first inspection result 531) regarding the first defect. For example, the first defect inspection processing may be configured to obtain defect inspection information using a machine learning model such as the third neural network 630 (see FIG. 10) or a support vector machine.

In step S125, the processor 102 performs the second defect-specific processing on the scanned image SI to generate the second comparison data 517. The second defect-specific processing may be, for example, image conversion processing including the low-resolution processing described with reference to FIG. 8.

In step S126, the processor 102 performs second defect inspection processing by using the second comparison data 517 and the second comparison reference data 507 held in the storage unit 508 to obtain an inspection result (second inspection result 532) regarding the second defect. The second defect inspection processing may be configured to include, for example, difference processing of comparing the second comparison reference data 507 and the second comparison data 517 to each other in units of pixels.

In step S127, the processor 102 performs processing of outputting an inspection result based on the first inspection result 531 obtained through the first defect inspection processing (step S124) and the second inspection result 532 obtained through the second defect inspection processing (step S126). Outputting processing of the inspection result includes, for example, processing of displaying information on the inspection result on the display device 124. In addition, the outputting processing of the inspection result may include outputting of a control signal for the stamping processing and/or outputting of a switching control signal of a paper transport path for changing an accumulation destination (paper output destination) of the printed material.

In step S128, the processor 102 determines whether or not to end printing of the original image BI. In a case where printing of the number of print sheets designated in the printing job is not completed, a determination result in step S128 is determined as "No". On the other hand, in a case where the printing of the number of print sheets designated in the printing job is completed, or in a case where, for example, an instruction to stop printing is input from a user interface, or the printing operation is paused because an abnormal state in which the printing cannot be continued is detected by a sensor provided in the printing system 101, the determination result of step S128 is determined as "Yes".

In the case where the determination result in step S128 is determined as "No", the processor 102 returns to step S120 and continues the printing. Accordingly, the operations from step S120 to step S128 are repeated, and the inspection is immediately executed each time the printed material is printed.

In the case where the determination result in step S128 is determined as "Yes", the processor 102 ends the printing and ends the flowcharts of FIGS. 11 and 12.

Hardware Configuration of Each Processing Unit and Control Unit

Hardware structures of the processing units that execute various processes, such as the system control unit 310, the image processing unit 311, the transport control unit 312, the feeding control unit 313, the treatment liquid application control unit 314, the treatment liquid drying control unit 316, the drawing control unit 318, the inspection processing unit 319, the ink drying control unit 320, the sorting control unit 322, and the paper output control unit 324 described with reference to FIG. 3, and the original image acquisition unit 502, the first preprocessing unit 504, the second preprocessing unit 506, the scanned image acquisition unit 510, the first defect-specific processing unit 514, the second defect-specific processing unit 516, the defect inspection unit 520, the first defect inspection unit 521, the second defect inspection unit 522, the inspection result output unit 530, and the like described with reference to FIG. 9 are various processors as described below.

The various processors include a CPU, which is a general-purpose processor that executes a program and functions as various processing units, a programmable logic device (PLD), which is a processor that can be changed in circuit configuration after manufacturing, such as a GPU or FPGA, a dedicated electric circuit, which is a processor having a circuit configuration specially designed for executing a specific process, such as an application specific integrated circuit (ASIC), and the like.

One processing unit may be configured with one of these various processors, or may be configured with two or more processors of the same type or different types. For example, one processing unit may be configured by a plurality of FPGAs, a combination of a CPU and an FPGA, or a combination of a CPU and a GPU. Alternatively, a plurality of processing units may be configured with one processor. As an example in which a plurality of processing units are configured with one processor, first, as represented by a computer such as a client or a server, there is a form in which one processor is configured by a combination of one or more CPUs and software, and this processor functions as a plurality of processing units. Secondly, as represented by a system-on-chip (SoC) or the like, there is a form in which a processor that realizes the functions of the entire system including a plurality of processing units with one integrated circuit (IC) chip is used. As described above, the various processing units are configured by using one or more of the various processors as the hardware structure.

Furthermore, the hardware-like structure of these various processors is, more specifically, an electric circuit (circuitry) in which circuit elements such as semiconductor elements are combined.

Program for Operating Computer

It is possible to record a program that causes a computer to realize a part or all of processing functions of each of the printed material inspection device 500 and the machine learning system described in the above embodiment on a computer-readable medium, which is an optical disk, a magnetic disk, a semiconductor memory, or another tangible non-transitory information storage medium, and to provide the program through this information storage medium.

In addition, instead of the form in which the program is recorded on such a tangible non-transitory computer-readable medium, it is also possible to provide a program signal as a download service using an electric communication line, such as the Internet.

Furthermore, a part or all of the processing functions of the printed material inspection device 500 and the machine learning system described above can be realized by cloud computing, or can be provided as software as a service (SaaS).

Effects of Embodiment

According to the above-described embodiment, the following effects can be obtained.

[1] By performing the preprocessing on the original image BI before acquiring the scanned image SI, it is possible to reduce the processing time after acquiring the scanned image SI, that is, to improve the processing speed of the inspection. In addition, since time-consuming and complex preprocessing such as feature amount extraction can be performed on the original image BI, the accuracy of the inspection is improved.

[2] Since appropriate processing can be performed on each of a plurality of types of defects that may occur in the printed material, the accuracy of the inspection is improved.

Jetting Method of Ink Jet Head

An ejector of an ink jet head is configured to include a nozzle from which a liquid is jetted, a pressure chamber that communicates with the nozzle, and a jetting energy generating element that applies jetting energy to a liquid in the pressure chamber. Regarding a jetting method for jetting droplets from the nozzle of the ejector, a unit for generating the jetting energy is not limited to a piezoelectric element, and various jetting energy generating elements, such as a heat generating element and an electrostatic actuator, can be applied. For example, it is possible to adopt a method of jetting droplets by utilizing a pressure during film boiling due to heating of the liquid by the heat generating element. A jetting energy generating element corresponding to the jetting method of the ink jet head is provided in a flow path structure.

Recording Medium

The "paper" is an example of a recording medium used for forming an image. The term "recording medium" is a general term for various terms such as paper, recording paper, printing paper, a printing medium, a typing medium, a printed medium, an image forming medium, an image-formed medium, an image receiving medium, and a jetted medium. A material, a shape, and the like of the recording medium are not particularly limited, and seal paper, a resin sheet, a film, cloth, non-woven fabric, and other various sheet bodies can be used regardless of material or shape. The recording medium is not limited to the sheet-fed medium, and may also be a continuous form medium such as continuous form paper. In addition, the sheet-fed medium is not limited to cut paper prepared in a predetermined size in advance, and may also be obtained by cutting a continuous form medium into a predetermined size at any time.

Printing Apparatus

In the above-described embodiment, the single-pass type ink jet printer 1 has been described as an example of the printing apparatus. However, the printing apparatus used for printing a printed material may have various forms, regardless of plate printing or plateless printing. The printed material inspection device and the printed material inspection method according to the embodiment of the present disclosure can also be applied to, for example, various printing apparatuses such as a multi-scan type ink jet printer that forms an image by reciprocating a short ink jet head for scanning, an electrophotographic apparatus, or an offset printer.

Terms

The term "printing apparatus" is synonymous with terms such as a printing machine, a printer, a typing apparatus, an image recording apparatus, an image forming apparatus, an image output apparatus, or a drawing apparatus.

The term "image" is to be construed in a broad sense, and includes a color image, a black-and-white image, a monochromatic image, a gradation image, a uniform density (solid) image, and the like. The term "image" is not limited to a photographic image, and is used as a comprehensive term including a pattern, text, symbols, line drawings, a mosaic pattern, a color fill pattern, various other patterns, or an appropriate combination thereof. The "printing" includes concepts of terms such as formation of an image, recording of an image, typing, drawing, and printing.

Other

The present disclosure is not limited to the embodiments described above, and various modifications can be made without departing from the gist of the technical idea of the present disclosure.

EXPLANATION OF REFERENCES

1: ink jet printer
10: feeding unit
11: transport mechanism
12: feeding device
12A: feeding tray
14: feeder board
16: feeding drum
20: treatment liquid applying unit
22: treatment liquid coating drum
23: gripper
24: treatment liquid coating device
30: treatment liquid drying unit
32: treatment liquid drying drum
33: gripper
34: hot air blower
40: drawing unit
42: drawing drum
43: gripper
44: head unit
46C: ink jet head
46K: ink jet head
46M: ink jet head
46Y: ink jet head
47: roller
48: scanner
50: ink drying unit
55: sorting unit
60: accumulation unit
62: accumulation device
62A: accumulation tray
70: chain gripper
71A: first sprocket
71B: second sprocket
72: chain
74: gripper
80: paper guide
82: first paper guide
84: second paper guide
90: heat-drying treatment unit
100: control device
101: printing system
102: processor
104: computer-readable medium
106: communication interface
108: input/output interface
110: bus
112: RAM
114: ROM
116: storage
122: input device
124: display device
304: communication unit
310: system control unit
311: image processing unit 312: transport control unit
313: feeding control unit
314: treatment liquid application control unit
316: treatment liquid drying control unit
318: drawing control unit
319: inspection processing unit
320: ink drying control unit
322: sorting control unit
324: paper output control unit
332: image memory
334: parameter storage unit
336: program storage unit
350: host computer
401: streak
401A: streak feature
402: stain
402A: stain feature
500: printed material inspection device
502: original image acquisition unit
504: first preprocessing unit
505: first comparison reference data
506: second preprocessing unit
507: second comparison reference data
508: storage unit
510: scanned image acquisition unit
514: first defect-specific processing unit
515: first comparison data
516: second defect-specific processing unit
517: second comparison data
520: defect inspection unit
521: first defect inspection unit
522: second defect inspection unit
530: inspection result output unit
531: first inspection result
532: second inspection result
610: first neural network
620: second neural network
630: third neural network
BI: original image
BF: original image feature amount
CD: comparison data
CD1: comparison data
CD2: comparison data
CI: converted image
CP: comparison processing
CP1: comparison processing
CP2: comparison processing
CSI: compressed image
F5A: left diagram
FSB: right diagram
IR: inspection result
IR1: detection result of first defect
IR2: detection result of second defect
LRI: low-resolution image
NAI: noise-added image
P: paper
P11: color conversion processing
P12: resolution conversion processing
P13: noise addition processing
PP1, PP11, PP12: preprocessing
PP2, PP21, PP22: preprocessing
RD: comparison reference data
RD1: comparison reference data
RD2: comparison reference data
SI: scanned image
SF: scanned image feature amount
S11 to S20: steps of inspection processing method
S110 to S128: steps of operation of printing system including printed material inspection device

What is claimed is:

1. A printed material inspection device for detecting a plurality of types of defects of a printed material by using inspection data acquired based on a captured image obtained by imaging the printed material and reference data which is a digital image of a printing target image indicated by print data of the printed material, the printed material inspection device comprising:
one or more processors; and
one or more storage devices,
wherein the one or more processors are configured to
acquire the reference data,
perform, as preprocessing of converting the reference data for comparing the reference data and the inspection data to each other, a plurality of types of preprocessing, which are different depending on a defect type of a detection target, on the reference data before the inspection data is acquired, to generate a plurality of pieces of comparison reference data, which are different depending on the defect type of the detection target, from the reference data, and
hold the plurality of pieces of comparison reference data in the one or more storage devices.

2. The printed material inspection device according to claim 1,
wherein the plurality of types of preprocessing include first feature amount extraction processing of extracting a feature amount indicating an image feature of the reference data.

3. The printed material inspection device according to claim 2,
wherein the first feature amount extraction processing is performed by using a first deep learning model.

4. The printed material inspection device according to claim 1,
wherein the plurality of types of preprocessing include image conversion processing of bringing a data configuration of the reference data close to a data configuration of the inspection data.

5. The printed material inspection device according to claim 4,
wherein the image conversion processing includes resolution conversion processing.

6. The printed material inspection device according to claim 4,
wherein the image conversion processing includes color conversion processing of converting a color space of the reference data into a color space of the captured image.

7. The printed material inspection device according to claim 6,
wherein the reference data is represented by CMYK data including color information of cyan, magenta, yellow, and black,
the captured image is represented by RGB data including color information of red, green, and blue, and
the color conversion processing includes processing of converting the CMYK data into the RGB data.

8. The printed material inspection device according to claim 4,
wherein the image conversion processing includes noise addition processing of adding noise included in the inspection data to the reference data.

9. The printed material inspection device according to claim 8,
wherein the noise included in the inspection data includes at least one of geometric noise or optical noise.

10. The printed material inspection device according to claim 1,
wherein the plurality of types of preprocessing include at least one of edge extraction processing or blurring processing.

11. The printed material inspection device according to claim 10,
wherein the plurality of types of preprocessing include the edge extraction processing and the blurring processing, and
the one or more processors are configured to
hold edge extraction data obtained by performing the edge extraction processing and blurring-processed data obtained by performing the blurring processing in the one or more storage devices.

12. The printed material inspection device according to claim 1,
wherein the one or more processors are configured to:
acquire the inspection data;
generate a plurality of pieces of comparison data, which are different depending on the defect type of the detection target, based on the inspection data; and
perform comparison processing of comparing each of the plurality of pieces of comparison data to the corresponding comparison reference data for each defect type of the detection target.

13. The printed material inspection device according to claim 12,
wherein the one or more processors are configured to perform a plurality of types of processing, which are different depending on the defect type of the detection target, on the inspection data in order to obtain the plurality of pieces of comparison data, and
the plurality of types of processing performed on the inspection data include second feature amount extraction processing of extracting a feature amount of the inspection data.

14. The printed material inspection device according to claim 13,
wherein the second feature amount extraction processing is performed by using a second deep learning model.

15. The printed material inspection device according to claim 12,
wherein the comparison processing includes processing using a machine learning model that is trained to receive the comparison data and the corresponding comparison reference data and to output at least one information of a presence or absence of the defect, a degree of the defect, or a position of the defect.

16. The printed material inspection device according to claim 15,
wherein the machine learning model is a third deep learning model.

17. The printed material inspection device according to claim 12,
wherein the comparison processing includes difference processing of calculating a difference between the comparison data and the corresponding comparison reference data.

18. The printed material inspection device according to claim 1,
wherein the plurality of types of defects include a first defect, which is a streak-shaped defect, and a second defect other than the first defect.

19. The printed material inspection device according to claim 18,
wherein the one or more processors are configured to:
perform, in order to perform processing of detecting the first defect, compression processing of compressing image information in a transport direction of a printing medium during printing of the printed material on each of the reference data and the inspection data; and
perform, in order to perform processing of detecting the second defect, low-resolution processing on each of the reference data and the inspection data.

20. The printed material inspection device according to claim 18,
wherein the one or more processors are configured to:
in order to detect the first defect, extract a feature amount of the reference data using a first deep learning model as first preprocessing in the plurality of types of preprocessing and hold the extracted feature amount in the one or more storage devices as first comparison reference data in the plurality of pieces of comparison reference data; and
in order to detect the second defect, perform image conversion processing of bringing a data configuration of the reference data close to a data configuration of the inspection data as second preprocessing in the plurality of types of preprocessing and hold conversion data obtained by the image conversion processing in the one or more storage devices as second comparison reference data in the plurality of pieces of comparison reference data.

21. The printed material inspection device according to claim 20,
wherein the image conversion processing includes at least one processing of resolution conversion processing, color conversion processing, edge extraction processing, blurring processing, or noise addition processing.

22. A printing system comprising:
the printed material inspection device according to claim 1;
a printing apparatus that performs printing based on the print data to generate the printed material; and
an imaging device that images the printed material.

23. A printed material inspection method of detecting a plurality of types of defects of a printed material by using inspection data acquired based on a captured image obtained by imaging the printed material and reference data which is a digital image of a printing target image indicated by print data of the printed material, the printed material inspection method comprising:
via one or more processors,
acquiring the reference data;
performing, as preprocessing of converting the reference data for comparing the reference data and the inspection data to each other, a plurality of types of preprocessing, which are different depending on a defect type of a detection target, on the reference data before the inspection data is acquired, to generate a plurality of pieces of comparison reference data, which are different depending on the defect type of the detection target, from the reference data; and
holding the plurality of pieces of comparison reference data in one or more storage devices.

24. A non-transitory, computer-readable tangible recording medium which records thereon a program for causing a computer to realize a function of detecting a plurality of types of defects of a printed material by using inspection data acquired based on a captured image obtained by imaging the printed material and reference data which is a digital image of a printing target image indicated by print data of the printed material, the program causing the computer to realize:

a function of acquiring the reference data;

a function of performing, as preprocessing of converting the reference data for comparing the reference data and the inspection data to each other, a plurality of types of preprocessing, which are different depending on a defect type of a detection target, on the reference data before the inspection data is acquired, to generate a plurality of pieces of comparison reference data, which are different depending on the defect type of the detection target, from the reference data; and a function of holding the plurality of pieces of comparison reference data in one or more storage devices.

* * * * *